United States Patent
Julien et al.

(10) Patent No.: US 12,131,185 B2
(45) Date of Patent: Oct. 29, 2024

(54) SHARING AND OVERSUBSCRIPTION OF GENERAL-PURPOSE GRAPHICAL PROCESSING UNITS IN DATA CENTERS

(71) Applicant: Telefonaktiebolaget LM Ericsson (publ), Stockholm (SE)

(72) Inventors: Martin Julien, Montreal (CA); Ganapathy Raman Madanagopal, Bengaluru (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 417 days.

(21) Appl. No.: 17/594,909

(22) PCT Filed: May 8, 2019

(86) PCT No.: PCT/SE2019/050408
§ 371 (c)(1),
(2) Date: Nov. 2, 2021

(87) PCT Pub. No.: WO2020/226541
PCT Pub. Date: Nov. 12, 2020

(65) Prior Publication Data
US 2022/0214912 A1    Jul. 7, 2022

(51) Int. Cl.
G06F 9/48    (2006.01)
G06F 9/50    (2006.01)

(52) U.S. Cl.
CPC .......... *G06F 9/4881* (2013.01); *G06F 9/505* (2013.01); *G06F 9/5072* (2013.01)

(58) Field of Classification Search
None
See application file for complete search history.

(56) References Cited

U.S. PATENT DOCUMENTS 8,199,158 B2 *  6/2012  Samson .................... G06T 1/00
                                                           345/519
2014/0181807 A1  6/2014  Fonseca et al.

OTHER PUBLICATIONS

Adrian M. Caulfield et al., "A Cloud-Scale Acceleration Architecture," 2016, 13 pages, Microsoft Corporation, IEEE.
(Continued)

*Primary Examiner* — Chat C Do
*Assistant Examiner* — William C Wood
(74) *Attorney, Agent, or Firm* — Nicholson De Vos Webster & Elliott LLP

(57) ABSTRACT

A method for managing general-purpose graphical processing units (GPGPUs) in a data center system is described. The method includes receiving, by a proxy agent, a GPGPU request from an application; selecting a GPGPU from a set of GPGPUs for processing a workload of the application based on one or more of available resources of the set of GPGPUs and requirements of the workload as indicated by the GPGPU request; establishing a session between an application agent located on a compute node on which the application is located and the proxy agent, and a second session between the GPGPU and the proxy agent in response to selecting the GPGPU to allow the GPGPU to process the workload, including subsequent GPGPU requests associated with the workload; and collecting a performance profile to describe usage of resources of the GPGPU by the workload.

20 Claims, 15 Drawing Sheets

(56) References Cited

OTHER PUBLICATIONS

Mathias Gottschlag et al., "LoGV: Low-overhead GPGPU Virtualization," 2013, pp. 1721-1726, 2013 IEEE International Conference on High Performance Computing and Communications & 2013 IEEE International Conference on Embedded and Ubiquitous Computing.
Ericsson White Paper, "Hyperscale Cloud," May 2016, 13 pages, 284 23-3289 Uen, Ericsson AB.
NVIDIA Corporation, "nvidia-smi—NVIDIA System Management Interface program," Jul. 26, 2016, 34 pages, NVIDIA Corporation.
Ridvan Ozaydin et al., "OpenCL Remote," 2012, pp. 830-835, 2012 IEEE 14th International Conference on High Performance Computing and Communications.
Kittisak Sajjapongse et al., "A Preemption-based Runtime to Efficiently Schedule Multi-process Applications on Heterogeneous Clusters with GPUs," Jun. 17-21, 2013, pp. 179-190, ACM.
Jagath Weerasinghe et al., "Disaggregated FPGAs: Network Performance Comparison against Bare-Metal Servers, Virtual Machines and Linux Containers," 2016, pp. 9-17, 2016 IEEE 8th International Conference on Cloud Computing Technology and Science.
Communication pursuant to Article 94(3) EPC, App. No. EP19724269.6, Feb. 15, 2023, 11 pages.
International Preliminary Report on Patentability, PCT App. No. PCT/SE2019/050408, Nov. 18, 2021, 13 pages.
International Search Report and Written Opinion, PCT App. No. PCT/SE2019/050408, Jan. 23, 2020, 15 pages.

* cited by examiner

| APPLICATION IDENTIFIER 202 | GPGPU IDENTIFIER 204 | PERFORMANCE PROFILE IDENTIFIER 206 |
|---|---|---|
| A | GPGPU 102A$_3$ | PROFILE$_{A,A3}$ |
| B | GPGPU 102Z$_1$ | PROFILE$_{B,Z1}$ |
| C | GPGPU 102A$_1$ | PROFILE$_{C,A1}$ |
| ⋮ | | |

| APPLICATION IDENTIFIER 202 | GPGPU IDENTIFIER 204 | PERFORMANCE PROFILE IDENTIFIER 206 | STATUS 208 |
|---|---|---|---|
| A | GPGPU 102A$_3$ | PROFILE$_{A,A3}$ | EVICTION |
| B | REMOTE MEMORY UNIT 132A$_1$ | N/A | EVICTED |
| C | GPGPU 102A$_1$ | PROFILE$_{C,A1}$ | SCHEDULED |
| ⋮ | | | |

FIG. 4

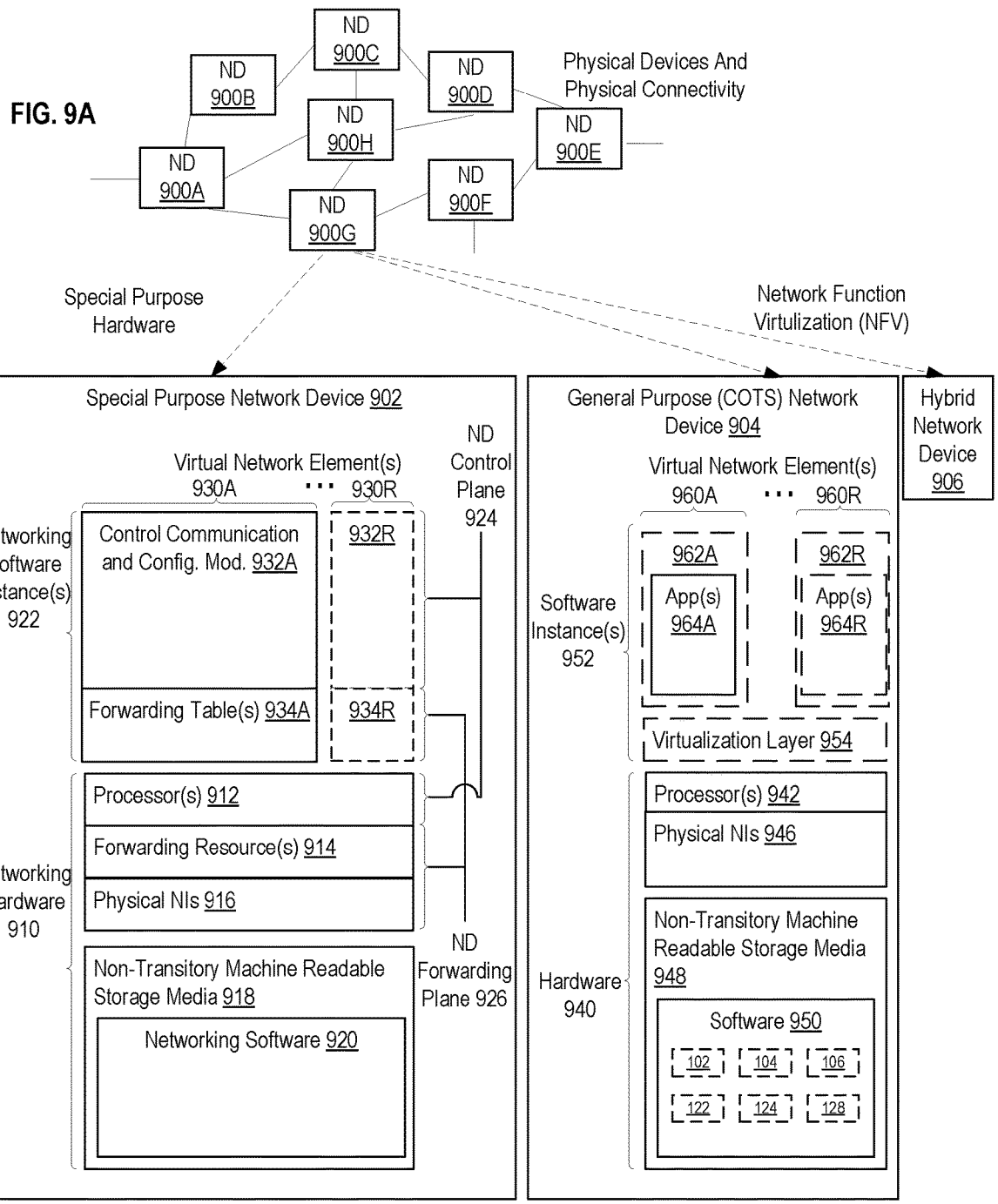

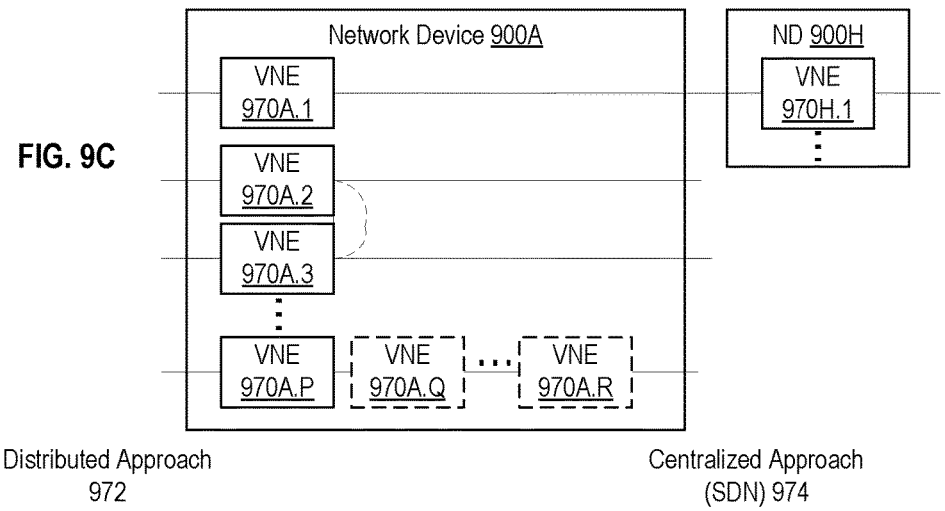
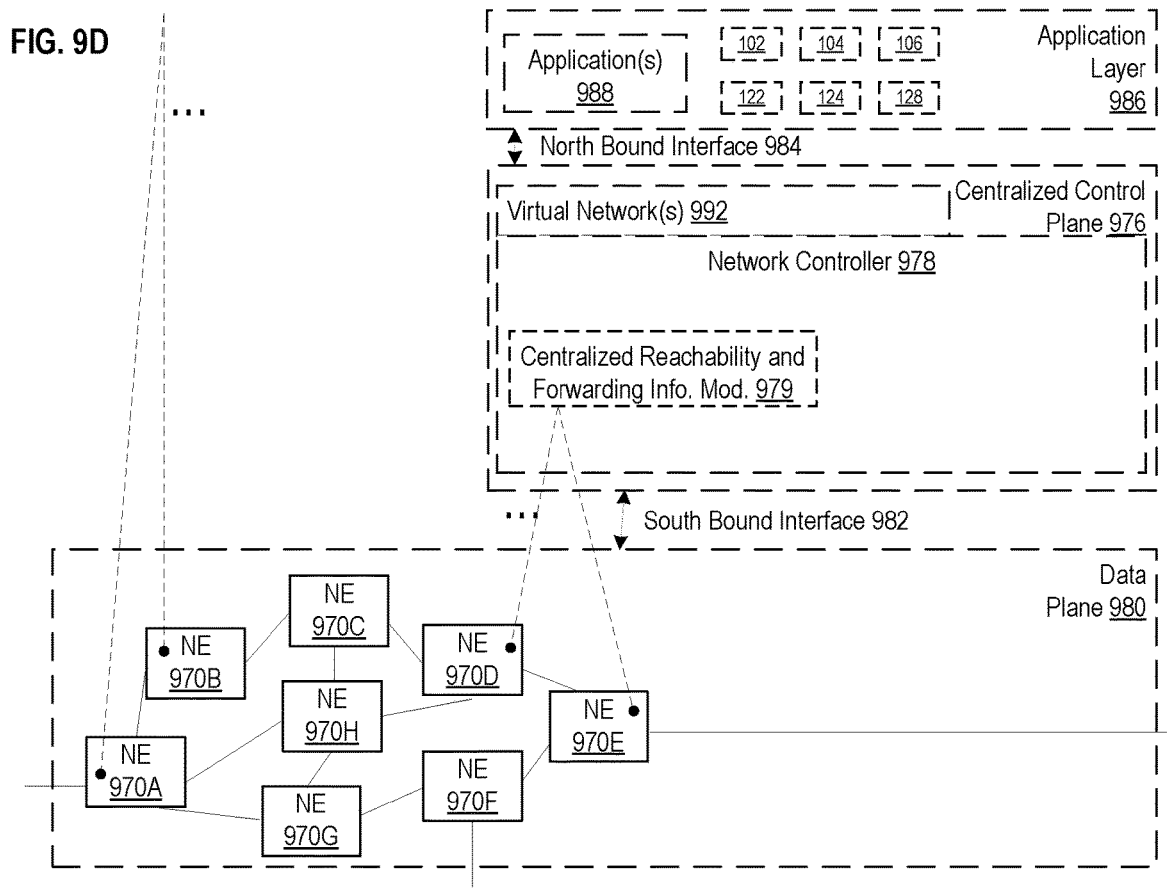
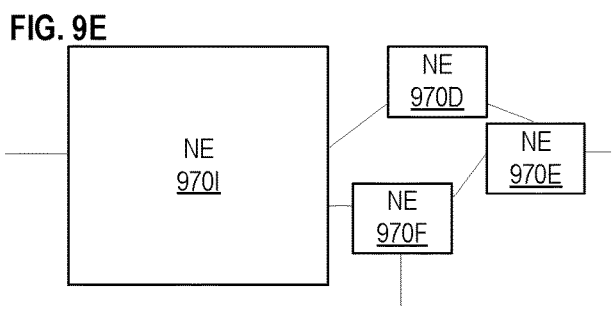
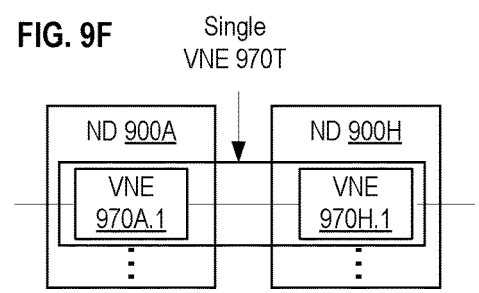

SHARING AND OVERSUBSCRIPTION OF GENERAL-PURPOSE GRAPHICAL PROCESSING UNITS IN DATA CENTERS

CROSS-REFERENCE TO RELATED APPLICATIONS

This application is a National stage of International Application No. PCT/SE2019/050408, filed May 8, 2019, which is hereby incorporated by reference.

TECHNICAL FIELD

Embodiments of the invention relate to the field of general-purpose graphics processing units (GPGPUs) in data centers; and more specifically, to the sharing and oversubscription of GPGPUs in data centers.

BACKGROUND ART

Hardware accelerators, such as graphical processing units (GPUs) and field-programmable gate arrays (FPGAs), can be used to accelerate data processing that are typically performed on general-purpose processors. Once GPUs were proven to be useful in speeding up specialized tasks, such as video rendering, a new generation of GPUs, referred to as general-purpose GPUs (GPGPUs), were introduced into the market. In addition to accelerating video rendering, these new GPGPUs were also designed to accelerate other heavy computational workloads, such as scientific algorithms related to big data analysis.

Considering that hardware accelerators might be designed to only accelerate specific tasks very efficiently, hardware accelerators might not be required for all workloads typically running in a data center. Instead, the idea of hardware disaggregation is preferred, as it aims to make hardware accelerators accessible to applications of a data center through remote access only when needed. For GPGPUs, technologies such as remote CUDA (rCUDA) allow GPGPUs to be remotely accessible from any consumer of a data center.

Typically, GPGPU resources are statically allocated to specific workloads, until the termination of the workload. Cloud orchestration technologies, such as Openstack® and Kubernetes®, do not allow sharing and over-provisioning of GPGPUs in data centers. Unlike general-purpose processors and associated random access memory, GPGPUs are not simultaneously shared amongst workloads. Instead, an entire GPGPU needs to be allocated to a specific workload and a new workload is not introduced until the previous workload is terminated/completed. However, not all workloads need an entire GPGPU nor will utilize a GPGPU for the entirety of an allocated time period. For example, machine learning workloads, which are mainly prediction workloads, do not require a GPGPU all the time, as opposed to GPGPU intensive training workloads. Instead, machine learning workloads require a GPGPU only when an input comes for prediction. During the remaining time period, the GPGPU is not utilized or is underutilized. Also, assuming that such workloads are not strictly time-bound or latency sensitive, seizing an entire GPGPU for such tasks could be considered inefficient. Accordingly, allocating a dedicated GPGPU for such workloads that intermittently utilize resources can lead to underutilization of GPGPUs.

SUMMARY

A method for managing general-purpose graphical processing units (GPGPUs) in a data center system is described. The method includes receiving, by a proxy agent, a first GPGPU request from a first application, wherein the first GPGPU request requests the scheduling of a first workload of the first application to a GPGPU in a set of GPGPUs of the data center system; selecting, by the proxy agent, a first GPGPU from the set of GPGPUs for processing the first workload of the first application based on one or more of (1) available resources of the set of GPGPUs and (2) requirements of the workload as indicated by the first GPGPU request; establishing, by the proxy agent, (1) a first session between an application agent located on a compute node on which the application is located and the proxy agent and (2) a second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collecting, by the proxy agent, a performance profile of the first workload on the first GPGPU to describe usage of resources of the first GPGPU by the first workload while the first GPGPU is processing the first workload.

A non-transitory machine-readable storage medium is described that provides instructions that, if executed by a processor of a proxy agent in a data center system, will cause said processor to perform operations. The operations include receiving a first GPGPU request from a first application, wherein the first GPGPU request requests the scheduling of a first workload of the first application to a GPGPU in a set of GPGPUs of the data center system; selecting a first GPGPU from the set of GPGPUs for processing the first workload of the first application based on one or more of (1) available resources of the set of GPGPUs and (2) requirements of the workload as indicated by the first GPGPU request; establishing (1) a first session between an application agent located on a compute node on which the application is located and the proxy agent and (2) a second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collecting a performance profile of the first workload on the first GPGPU to describe usage of resources of the first GPGPU by the first workload while the first GPGPU is processing the first workload.

A device for managing general-purpose graphical processing units (GPGPUs) in a data center system is described. The device is to receive a first GPGPU request from a first application, wherein the first GPGPU request requests the scheduling of a first workload of the first application to a GPGPU in a set of GPGPUs of the data center system; select a first GPGPU from the set of GPGPUs for processing the first workload of the first application based on one or more of (1) available resources of the set of GPGPUs and (2) requirements of the workload as indicated by the first GPGPU request; establish (1) a first session between an application agent located on a compute node on which the application is located and the proxy agent and (2) a second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collect a performance profile of the first workload on the first GPGPU to describe usage of resources of the first GPGPU by the first workload while the first GPGPU is processing the first workload.

As described above and as will be described below, the data center system assists in sharing resources of GPGPUs more efficiently in cloud environments by allowing GPGPUs to be oversubscribed for certain workloads/applications. In particular, workloads/applications allocated to GPGPUs are monitored to build usage/performance profiles per workload/application. These usage/performance profiles built for each workload/application can be used for predicting or otherwise better determining when a workload/application is underutilizing resources of GPGPUs. When a usage/performance profile indicates that a workload/application is underutilizing resources of a GPGPU or will likely underutilize resources of GPGPUs in the near future, the proxy agent may mark the workload/application for eviction from the current GPGPU. When the workload/application is to be processed again (e.g., a GPGPU request/command is received), the workload/application can be dynamically reassigned to another GPGPU. This dynamic movement of workloads/applications between GPGPUs removes the tight, static coupling of workloads/applications to GPGPUs. Further, through the use of emulated/virtual GPGPUs on compute nodes, GPGPU sharing is transparent to applications while still facilitating GPGPU time-sharing to reduce underutilization of GPGPUs.

BRIEF DESCRIPTION OF THE DRAWINGS

The invention may best be understood by referring to the following description and accompanying drawings that are used to illustrate embodiments of the invention. In the drawings:

FIG. 2 shows a mapping table that maps identifiers of workloads/applications to identifiers of assigned GPGPUs and corresponding performance profiles, according to some example embodiments.

FIG. 4 shows the mapping table that also includes status information, according to some example embodiments.

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

FIG. 9C illustrates various exemplary ways in which virtual network elements (VNEs) may be coupled according to some embodiments of the invention.

FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9E illustrates the simple case of where each of the NDs implements a single NE, but a centralized control plane has abstracted multiple of the NEs in different NDs into (to represent) a single NE in one of the virtual network(s), according to some embodiments of the invention.

FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

The following description describes methods and apparatus for the sharing and oversubscription of general-purpose graphics processing units (GPGPUs) in data centers. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
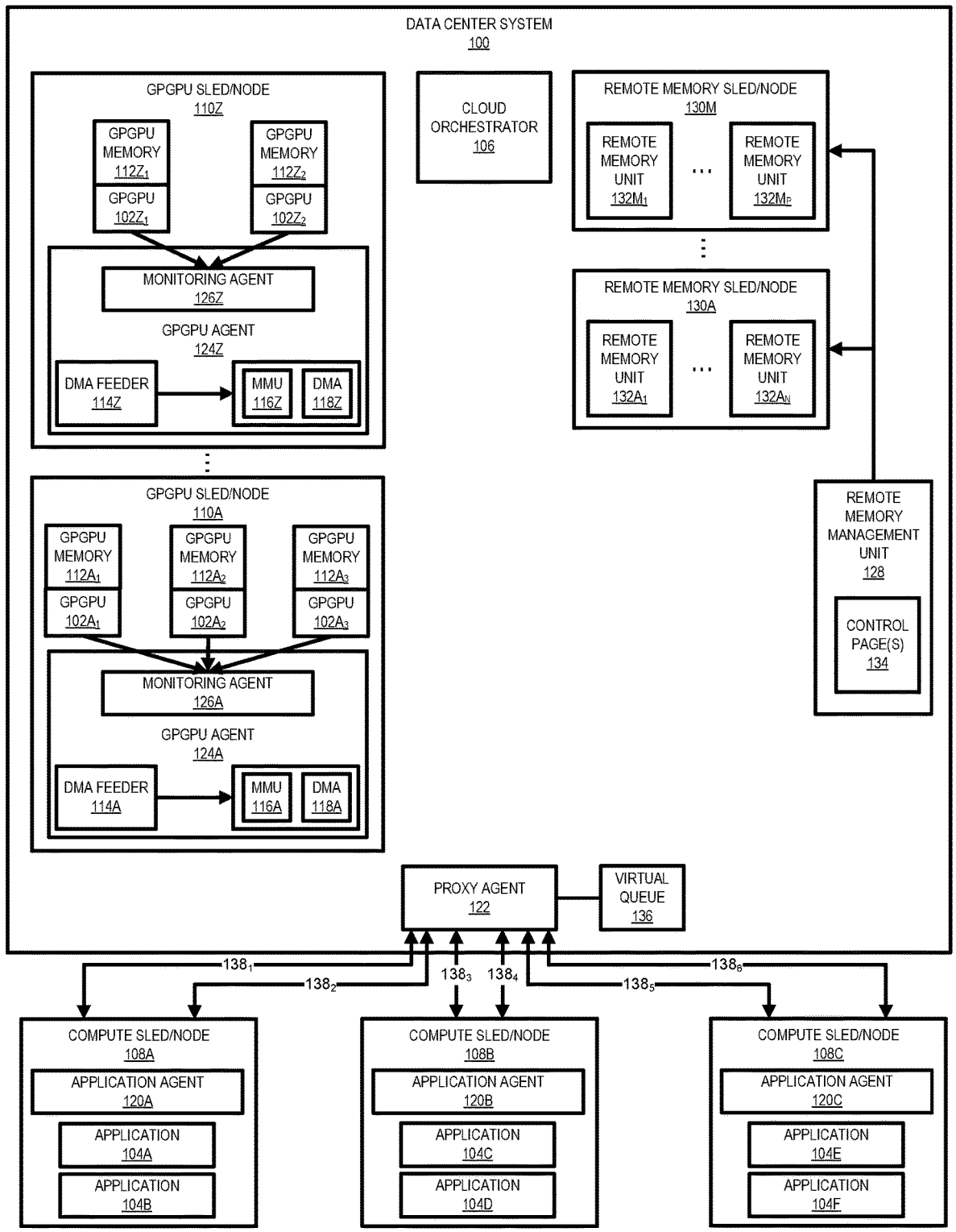
FIG. 1 illustrates a data center system where general-purpose graphical processing units (GPGPUs) are pooled for access by a number of applications, according to some example embodiments.

FIG. 1 illustrates a data center system 100, according to one example embodiment, where GPGPUs 102 are pooled for access by a number of applications 104. As used herein, each application 104 is associated with a workload to be processed/performed by a GPGPU 102. As shown in FIG. 1, the data center system 100 includes a cloud orchestrator 106, which is an entity that assists in scheduling/assigning workloads/applications 104 to GPGPUs 102 located on/within corresponding GPGPU nodes 110 (sometimes referred to as GPGPU sleds 110) to facilitate oversubscription/overscheduling of the GPGPUs 102. Namely, the cloud orchestrator 106 may be used for configuring and/or managing one or more entities of the data center system 100 such that the data center system 100 can provide dynamic and efficient scheduling of workloads/applications 104 to GPGPUs 102 based on up-to-date usage/performance workload/application profiles, which are derived by monitoring workload/application 104 processing by the GPGPUs 102.

Each element of the data center system 100 will be described below by way of example. Although the elements of the data center system 100 are shown in a single logical view/structure, each of the elements of the data center system 100 may be distributed across one or more devices and/or locations.

As shown in FIG. 1, the data center system 100 includes a set of GPGPU nodes 110A-110Z and each GPGPU node 110A-110Z includes a corresponding set of GPGPUs 102 (e.g., the GPGPUs $102A_1$-$102A_3$ of the GPGPU node 110A and the GPGPUs $102Z_1$ and $102Z_2$ of the GPGPU node 110Z) with corresponding GPGPU memory 112 for each GPGPU 102 (e.g., the GPGPU memories $112A_1$-$112A_3$ are associated with the GPGPUs $102A_1$-$102A_3$ and the GPGPU memories $112Z_1$ and $112Z_2$ are associated with the GPGPUs $102Z_1$ and $102Z_2$, respectively). The GPGPU memories 112 may be used by corresponding GPGPUs 102 for processing assigned workloads from corresponding applications 104. Accordingly, the GPGPU memories 112 act as local memory to respective GPGPUs 102. The number of GPGPU nodes 110 and corresponding GPGPUs 102 within each GPGPU node 110 may vary for different data center systems 100. Accordingly, the configuration of FIG. 1 is for purposes of illustration. In some embodiments, the GPGPUs 102 may vary in architecture such that separate GPGPUs 102 share or have different architectures, including potentially different amounts of GPGPU memory 112.

As used herein, a graphics processing unit (GPU) is a specialized electronic circuit designed to rapidly manipulate and alter memory to accelerate the creation of images in a frame buffer intended for output to a display device. A GPGPU 102 is a GPU, which is designed for computation of computer graphics, that is used to perform computation in applications traditionally handled by general-purpose processors (sometimes referred to as central processing units (CPUs)). Although the data center system 100 is described as using GPGPUs 102, in other embodiments, other hardware accelerators may be used in place of GPGPUs. For example, in some embodiments, field-programmable gate arrays (FPGAs) may be used for processing workloads of applications 104 instead of GPGPUs 102. Accordingly, the use of GPGPUs is for purposes of illustration.

Each of the applications 104 discussed above may be running on or may otherwise primarily reside on a compute node 108 and the compute nodes 108 may emulate virtual GPGPUs for the applications 104 such that access to the remote GPGPUs 102 is transparent to the applications 104. For instance, as shown in FIG. 1, three compute nodes 108A-108C (sometimes referred to as the compute sleds 108A-108C) include corresponding (1) sets of applications 104A-104B, 104C-104D, and 104E-104F and (2) application agents 120A-120C. The application agents 120A-120C (sometimes referred to as the application clients 120A-120C) provide an environment and set of libraries to assist applications 104 to access GPGPUs 102 through an abstraction layer provided by emulated/virtual GPGPUs. For example, in the case of a Kubernetes® system, an application agent 120 could load a customized device plugin to provide Compute Unified Device Architecture (CUDA) libraries for applications 104 to access GPGPUs 102 in the data center system 100.

As shown in FIG. 1, the compute nodes 108 and corresponding components (e.g., applications 104 and application agents 120) are communicatively coupled to the data center system 100 via a proxy agent 122 of the data center system 100. Although the compute nodes 108 are shown outside the data center system 100, in some embodiments, the compute nodes 108 may be within the data center system 100. However, regardless of their location, the compute nodes 108 are communicatively coupled to the proxy agent 122. The proxy agent 122 may be used for (1) scheduling/assigning applications 104 and associated workloads to GPGPUs 102 via corresponding GPGPU agents 124 of GPGPU nodes 110, which monitor/manage the GPGPUs 102, (2) evicting workloads/applications 104 from GPGPUs 102 based on monitored performance information/profiles of the workloads/applications 104, and (3) rescheduling/reassigning evicted workloads/applications 104 to other GPGPUs 102 via corresponding GPGPU agents 124 that monitor/manage these other GPGPUs 102 (e.g., the GPGPU agent 124A monitors the GPGPUs $102A_1$-$102A_3$ and associated GPGPU memories $112A_1$-$112A_3$, while the GPGPU agent 124Z monitors the GPGPUs $102Z_1$ and $102Z_2$ and associated GPGPU memories $112Z_1$ and $112Z_2$). To support these functions, application agents 120 establish a dedicated session $138_1$-$138_6$ with the proxy agent 122 for each associated application 104. These sessions 138 may be established in response to receipt of GPGPU requests from associated applications 104 that describe details of a workload of the application 104 to be assigned to a GPGPU 102 (e.g., an amount of GPGPU memory 112 and/or a desired/requested GPGPU 102 architecture), which may also be defined in a service level agreement (SLA) between an operator/administrator of the data center system 100 and operators/tenants associated with the applications 104. Alternatively, these sessions 138 may be established upon instantiation of the applications 104 on the compute nodes 108.

Based on the availability of resources of the GPGPUs 102 in the various GPGPU nodes 110 and requirements of the applications 104 (e.g., as indicated in GPGPU requests from the applications 104), the proxy agent 122 assigns applications 104 to various GPGPUs 102. To effectuate this assignment, the proxy agent 122 establishes a session with the corresponding GPGPU agent 124 managing/monitoring the assigned GPGPU 102 and provides the GPGPU agent 124 (1) an identifier of the application 104, (2) an identifier of the assigned GPGPU 102, and (3) a request to the GPGPU node 110 to execute future GPGPU requests from the application 104 by the assigned GPGPU 102. The proxy agent 122 may also maintain a mapping between the application 104 and the GPGPU 102 for future reference. For example, FIG. 2 shows a mapping table 200 (sometimes referred to as a workload mapping table 200 or an application mapping table 200) that maps identifiers 202 of workloads/applications 104 to identifiers 204 of assigned GPGPUs 102. In some embodiments, communications between (1) the application agent 120 and the proxy agent 122 and (2) the proxy agent 122 and the GPGPU agent 124 can use a customized protocol (e.g., rCUDA) for exchanging requests and responses (e.g., successful or unsuccessful execution/processing of a request).

Figure 3:
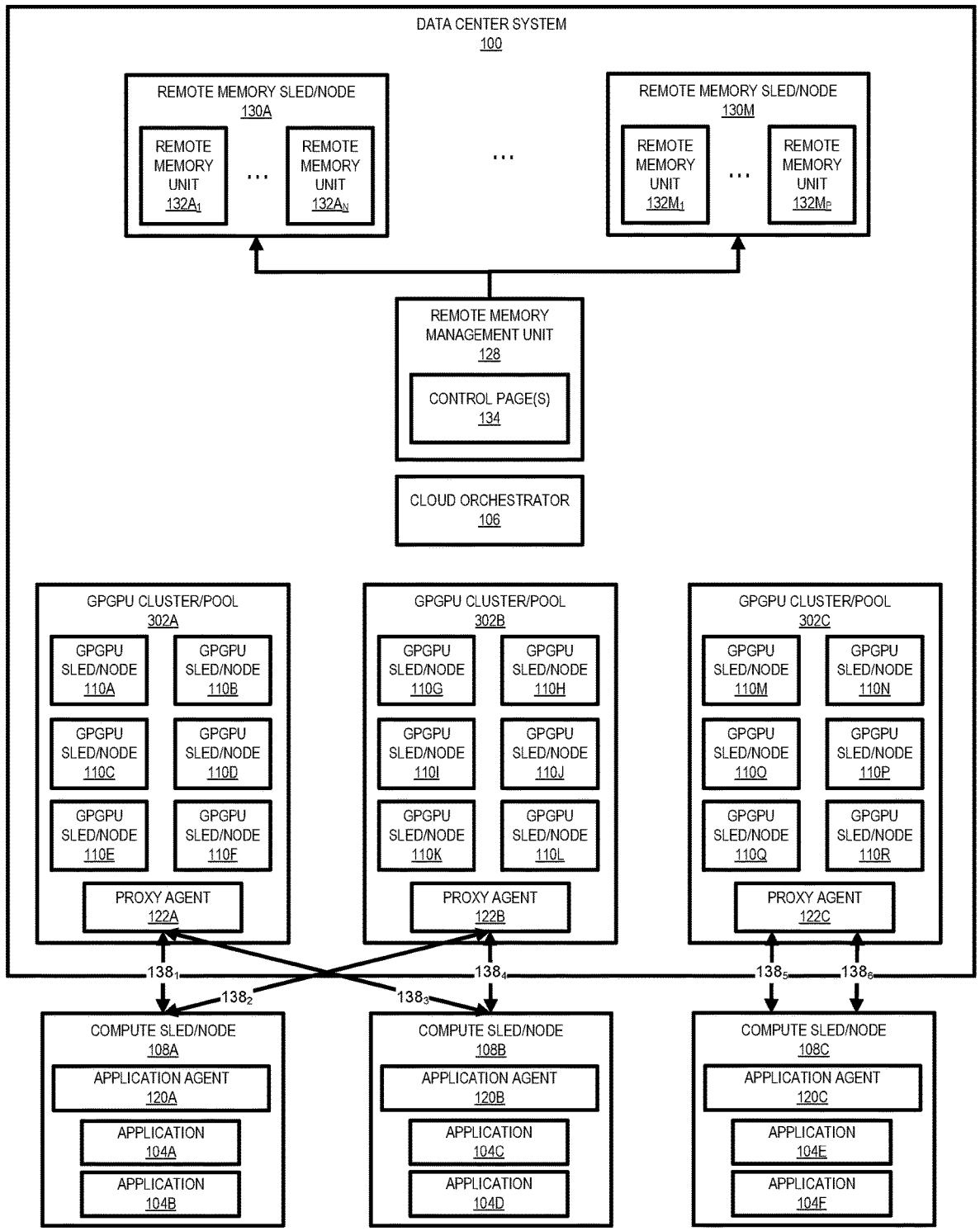
FIG. 3 illustrates a data center system with clusters/pools of GPGPUs and corresponding proxy agents, according to some example embodiments.

Although shown with a single proxy agent 122 for the entire data center system 100 of FIG. 1, in some embodiments multiple proxy agents 122 may be utilized by the data center system 100. For example, in a data center system 100 with large pools of GPGPUs 102, the GPGPUs 102 and corresponding GPGPU nodes 110 can be organized into clusters with each cluster including a separate proxy agent 122 to load balance the traffic between GPGPU nodes 110 of the cluster. For example, as shown in FIG. 3, a set of three GPGPU clusters 302A-302C (sometimes referred to as the GPGPU pools 302A-302C) each include a respective set of GPGPU nodes 110A-110F, 110G-110L, and 110M-110R. In this example, each GPGPU cluster 302A-302C includes a respective proxy agent 122A-122C to handle commands/requests from sets of compute nodes 108 and associated applications 104 as communicated via the sessions/connections $138_1$-$138_6$. Accordingly, the data center system 100 may include one or more proxy agents 122.

As shown in FIG. 1, each GPGPU agent 124A-124Z may include a respective monitoring agent 126A-126Z that monitors and profiles all the GPGPUs 102 in a corresponding GPGPU node 110A-110Z, including associated resources and workloads/applications 104 being processed by the GPGPUs 102. For example, the monitoring agents 126 can monitor active/running process kernels on GPGPUs 102, memory utilization of each process on the GPGPUs 102, GPGPU 102 utilization, GPGPU 102 temperature, etc. The monitoring agents 126 continuously generate monitoring information within an associated GPGPU node 110 and report this information to the proxy agent 122. The monitoring information produced by the monitoring agents 126 can be used to form performance/usage profiles for workloads/applications 104 that describe the performance/operation of workloads of the applications 104 on GPGPUs 102 and respective GPGPU memories 112. For example, FIG. 2 shows the performance profile identifiers 206 of each combination of application 104 and GPGPU 102 (e.g., the application 104A and corresponding workload that is assigned to the GPGPU $102A_3$ has a performance profile with the performance profile identifier 206 of $PROFILE_{A,A3}$; the application 104B and corresponding workload that is assigned to the GPGPU $102Z_1$ has a performance profile with the performance profile identifier 206 of $PROFILE_{B,Z1}$; and the application 104C and corresponding workload that is assigned to the GPGPU $102A_1$ has a performance profile with the performance profile identifier 206 of $PROFILE_{C,A1}$). In some embodiments, the proxy agent 122 may use workload/application performance/usage profiles for determining candidate applications 104 for possible eviction and consequent movement to other GPGPUs 102 in potentially other GPGPU nodes 110. Namely, as will be described in greater detail below, based on workload/application performance/usage profiles, the proxy agent 122 may determine workloads/applications 104 that are underutilizing resources of a GPGPU 102 (e.g., are idle for a period of time that is greater than a threshold idle period) and add these workloads/applications 104 to a candidate list of workloads/applications 104 for eviction.

In some embodiments, the GPGPUs 102, including associated memory management units (MMUs) 116A-116Z, do not maintain a reference bit or other explicit information for indicating usage of pages in page tables of the GPGPU memory 112A-112Z. Accordingly, determining exact GPGPU memory 112 usage per application 104 for corresponding performance/usage profiles is challenging. To address this challenge, the monitoring agents 126 track GPGPU memory 112 allocations and corresponding virtual addresses in use for workloads of applications 104. The monitoring agent 126 further tracks scheduling and execution of GPGPU kernels (i.e., block functions that can be scheduled and executed in parallel on multiple GPGPU simultaneously) for workloads of applications 104. To measure the idle time of workloads of applications 104 on GPGPUs 102, the monitoring agents 126 maintains a cumulative record of how frequently the workloads' kernels are executed in the GPGPUs 102 (e.g., how frequently GPGPU requests/commands, such as cudaMalloc( ), cudaMemcpy( ), and/or cudaLanchKemel( ), are executed over the given period of time). The monitoring agent 126 may further track network activity (e.g., number of packets per seconds) for workloads of applications 104 to measure workload idle time on a GPGPU 102.

If a performance/usage profile for an application 104 reveals an idle time for an associated workload on a GPGPU 102 that is greater that a given threshold usage/idle value, which may be configurable by the cloud orchestrator 106, then the proxy agent 122 may select this workload and corresponding application 104 for eviction from the GPGPU 102. For example, the proxy agent 122 may place this workload/application 104 on a list of workload/application candidates for eviction. Based on GPGPU 102 demand in the data center system 100 by a new or an already evicted workload/application 104 that needs to be scheduled/rescheduled to a GPGPU 102, the proxy agent 122 may select a candidate workload/application 102 from a list of workload/application candidates with similar characteristics (e.g., a similar memory profile) to the workload/application 104 to be placed, a lower priority level, and/or based on a round robin approach. In some embodiments, the proxy agent 122 may request a corresponding GPGPU agent 124 associated with the soon to be evicted workload/application 104 to prioritize and finish any pending GPGPU requests and commands in a command queue of the GPGPU 102 to facilitate eviction with minimal impact to the evicted workload/application 104. The GPGPU agent 124 waits for the existing requests/commands and the workload's kernel to run for its completion. Upon completion, the GPGPU agent 124 informs the proxy agent 122 that the contents of the GPGPU memory 112 associated with the evicted workload/application 104 are ready to be moved. Further, the total GPGPU memory 112 currently allocated to the workload/application 104 and the total GPGPU memory 112 available to the GPGPU 102 is also reported to the proxy agent 122.

To facilitate the eviction, the proxy agent 122 contacts the remote memory management unit 128, which manages a set of remote memory nodes 130A-130M (sometimes referred to as the remote/global memory sleds 130A-130M) and requests a range of memory addresses corresponding to the remote memory units $132A_1$-$132A_N$ and $132M_1$-$132M_P$ (sometimes referred to as the global memory units $132A_1$-$132A_N$ and $132M_1$-$132M_P$) that may be used to store and retrieve the entire evicted workload's/application's 104 contents from the GPGPU 102/GPGPU memory 112. Unlike traditional commodity server architectures, where memory is very tightly coupled to the processing unit on the same sled/node, the remote memory management unit 128, the remote memory nodes 130A-130M, and the remote memory units $132A_1$-$132A_N$ and $132M_1$-$132M_P$ provide disaggregated hardware that offer the capability to have a portion of memory (apart from the GPGPU memory 112 that is local to the GPGPUs 102 and connected to respective GPGPUs 102 via a fast interconnect) reside in another sled/node 130. The cloud orchestrator 106 may configure these remote memories such that the remote memory units $132A_1$-$132A_N$ and $132M_1$-$132M_P$ are accessible to GPGPUs 102 via a high-speed interconnect network of the data center system 100. In this capacity, the remote memory units $132A_1$-$132A_N$ and $132M_1$-$132M_P$, as managed by the remote memory management unit 128, offer a global source of memory for components of the data center system 100, including the GPGPUs 102.

For example, the remote memory management unit 128 may allocate a requested number of addresses/memory from the remote memory units 132 of the remote memory nodes 130 and returns the range of addresses/set of the remote memory units 132 to the proxy agent 122. The remote memory management unit 128 also allocates space for a control page 134 to map virtual addresses of the evicted workload/application 104 to the corresponding addresses (e.g., physical addresses) of the remote memory units 132. The proxy agent 122 provides the memory address range (and IP memory address, in case of RDMA) and address of the control page 134 to the GPGPU agent 124 to initiate the eviction process.

Following receipt of the memory address range corresponding to the remote memory units 132, the GPGPU agent 124 provides workload's/application's 104 range of virtual addresses (i.e., the source addresses) and the memory address range in the remote memory units 132 (i.e., the destination addresses) to a direct memory access (DMA) feeder 114 to initiate the transfer of data to the remote memory units 132. The DMA feeder(s) 114A-114Z write the source and destination address into registers of the corresponding DMA unit(s) 118A-Z (multiple addresses in parallel for all the available DMA channels). During the transfer of data from the GPGPU memory 112 to the remote memory units 132, the DMA feeder 114 updates the allocated control page 134 with virtual addresses and corresponding addresses of the remote memory units 132.

To avoid discrepancies during the data transfer, the proxy agent 122 updates a corresponding status entry for the application-to-GPGPU map to note that the application is in progress of being evicted. For example, as shown in FIG. 4, the table 200 of FIG. 2 can be expanded to include a status 208. As shown, the status 208 can indicate that a workload/application 104 is in the process of being evicted ("EVICTION"), has been evicted ("EVICTED"), or is scheduled with a GPGPU 102 ("SCHEDULED"). This notation will act to stop the GPGPU 102 from further executing commands/requests on behalf of the workload/application 104. Further, to maintain complete transparency of the eviction to the application 104 on the compute node 108, GPGPU requests from the application 104 received at commencement of the eviction and data transfer are buffered in a virtual queue 136 of the proxy agent 122 without forwarding them to the previously allocated GPGPU 102.

On completion of the data transfer for a workload/application 104 eviction, the GPGPU agent 124 requests the MMU 116 to free the now transferred portions/addresses of the GPGPU memory 112, which were previously utilized by the now evicted workload/application 104, and inform the proxy agent 122 about the completion of the transfer. In response, the proxy agent 122 terminates the connection/session with the GPGPU agent 124 for the old/evicted workload/application 104 and initiates a new connection/session with the GPGPU agent 124 for scheduling the new workload/application 104.

When the old/evicted workload/application 104 tries to access the GPGPU 102 again, the proxy agent 122 notices that associated data of the workload/application 104 is not in the GPGPU memory 112 but is instead in the remote memory units 132 and buffers associated requests/commands in the virtual queue 136. This determination may be made based on the table 200, which includes the status 208 of the workloads/applications 104. The proxy agent 122 identifies a new available GPGPU 102 (possibly requiring an eviction) and assigns the identified GPGPU 102 to the previously evicted workload/application 104. As described above, this assignment includes the proxy agent 122 establishing a new session with the newly-allocated GPGPU agent 124 and provides the control page 134 to the GPGPU agent 124 along with a request to transfer data from the indicated portions of the remote memory units 132 into the new GPGPU memory 112 via the DMA unit 118.

Upon completion of the data transfer from the remote memory units 132 to the new GPGPU memory 112, the proxy agent 122 updates the mapping in the table 200 and copies any requests/commands from the virtual queue 136 that are associated with the workload/application 104 into command submission channels of the newly-assigned GPGPU 102. Future requests/commands are forwarded to the new GPGPU. Further, upon completion of the data transfer from the remote memory units 132 to the new GPGPU memory 112, the proxy agent 122 instructs the remote memory management unit 128 to free the memory addresses corresponding to the remote memory units 132 associated with the workload/application 104 newly-assigned to a GPGPU 102.

As described above, monitoring information from monitoring agents 126 can be used to generate performance/usage profiles for workloads/application 104 that describe resources usage in relation to GPGPU 102 and associated GPGPU memory 112. Using such workload/application profiles, the proxy agent 122 can predict when a workload/application 104 should be evicted from a GPGPU 102 (i.e., in response to predicting a low resource utilization), as well as when a workload/application 104 should be reallocated to a GPGPU 102 before a workload/application 104 makes a real-time GPGPU request.

In scenarios where a GPGPU 102 becomes available without eviction on the GPGPU node 110 from which a workload/application 104 was previously evicted (e.g., due to normal termination of a workload/application 104), the GPGPU agent 124 can inform the availability of GPGPU 102 resources to the proxy agent 122. Thereafter, the proxy agent 122 can request the GPGPU agent 124 to pre-fetch the data of the evicted workload/application 104 from the remote memory units 132 and move this data into the GPGPU memory 112 of the newly-freed GPGPU 102.

As described above and as will be described below, the data center system 100 assists in sharing resources of GPGPUs 102 more efficiently in cloud environments by allowing GPGPUs 102 to be oversubscribed for certain workloads/applications 104. In particular, workloads/applications 104 allocated to GPGPUs 102 are monitored to build usage/performance profiles per workload/application 104.

These usage/performance profiles built for each workload/application 104 can be used for predicting or otherwise better determining when a workload/application 104 is underutilizing resources of GPGPUs 102. When a usage/performance profile indicates that a workload/application 104 is underutilizing resources of a GPGPU 102 or will likely underutilize resources of GPGPUs 102 in the near future, the proxy agent 122 may mark the workload/application 102 for eviction from the current GPGPU 102. When the workload/application 104 is to be processed again (e.g., a GPGPU request/command is received), the workload/application 104 can be dynamically reassigned to another GPGPU 102. This dynamic movement of workloads/applications 104 between GPGPUs 102 removes the tight, static coupling of workloads/applications 104 to GPGPUs 102. Further, through the use of emulated/virtual GPGPUs on compute nodes 108, GPGPU 102 sharing is transparent to applications 104 while still facilitating GPGPU 102 time-sharing to reduce underutilization of GPGPUs 102.

Figure 5A:
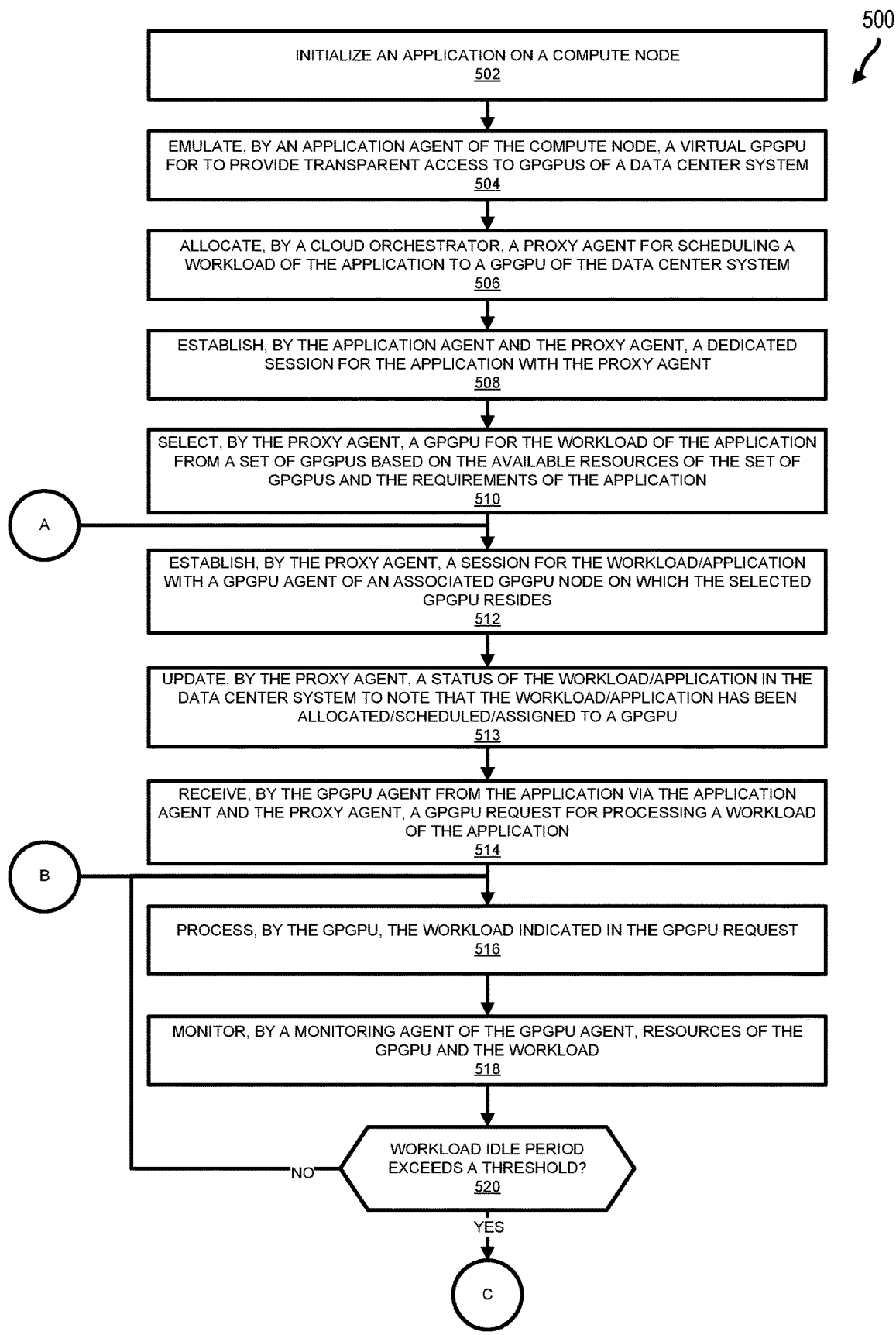
FIGS. 5A-5C illustrate a method for managing placement/scheduling of workloads of applications to GPGPUs in the data center system, according to one example embodiment.
Figure 5B:
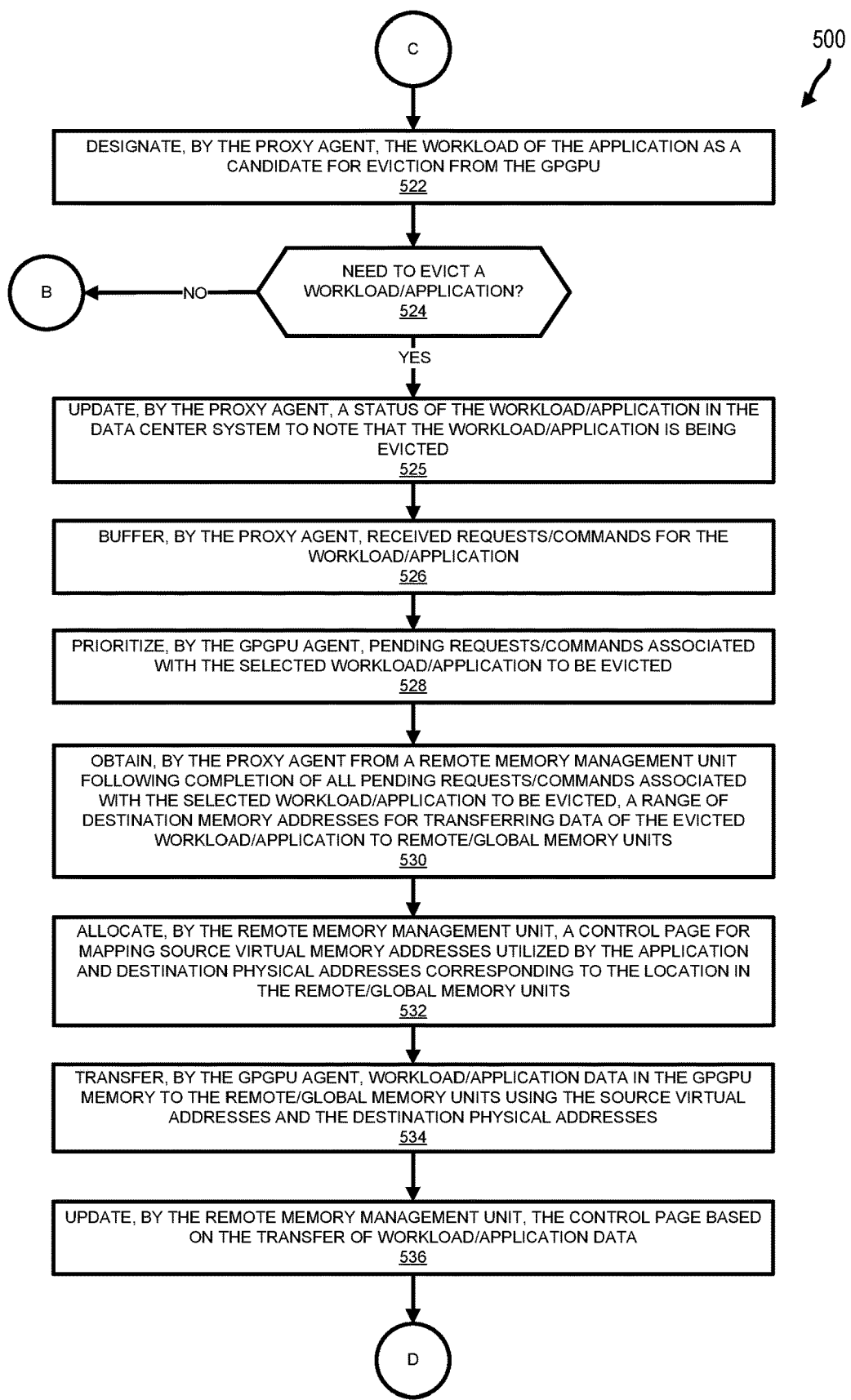
Figure 5C:
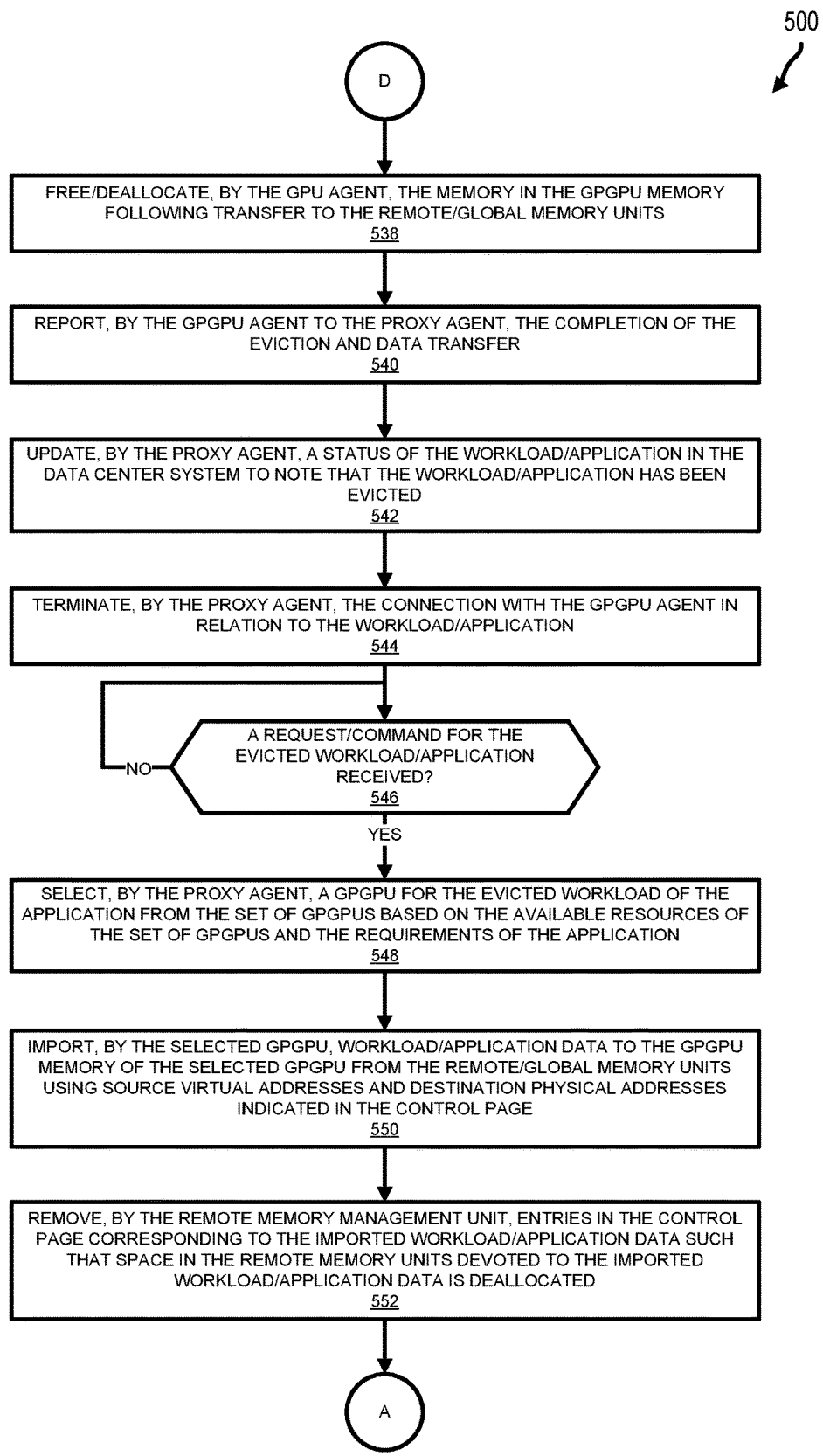

Turning now to FIGS. 5A-5C, a method 500 will be described for managing placement/scheduling of workloads of applications 104 to GPGPUs 102 in the data center system 100, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIGS. 5A-5C, the method 500 may commence at operation 502 with an application 104 being initialized on a compute node 108. For example, the application 104A may be initialized on the compute node 108A at operation 502. The application 104A initialized at operation 502 may be associated with a workload that the application 104A is seeking to have performed on a GPGPU. As will be described below, the compute node 108A may facilitate processing of the workload of the application 104A through use of the GPGPUs 102 of the data center system 100. Although the method 500 may be performed in relation to any application 104, for purposes of explanation, the method 500 will be described in relation to the application 104A.

At operation 504, the application agent 120A of the compute node 108A emulates virtual GPGPUs for the application 104A such that access to the remote GPGPUs 102 in the data center system 100 is transparent to the applications 104A. In particular, the application agent 120A provides an environment and set of libraries to assist the application 104A to access GPGPUs 102 of the data center system 100 through an abstraction layer provided by emulated/virtual GPGPUs.

At operation 506, a cloud orchestrator 106 of the data center system 100 allocates a proxy agent 122 for scheduling a workload of the application 104A to a GPGPU 102 of the data center system 100. The proxy agent 122 may be used for (1) scheduling/assigning applications 104 and associated workloads to GPGPUs 102 via corresponding GPGPU agents 124 of GPGPU nodes 110, which monitor/manage the GPGPUs 102, (2) evicting workloads/applications 104 from GPGPUs 102 based on monitored performance information/profiles of the workloads/applications 104, and (3) rescheduling/reassigning evicted workloads/applications 104 to other GPGPUs 102 via corresponding GPGPU agents 124 that monitor/manage these other GPGPUs 102 (e.g., the GPGPU agent 124A monitors the GPGPUs $102A_1$-$102A_3$ and associated GPGPU memories $112A_1$-$112A_3$, while the GPGPU agent 124Z monitors the GPGPUs $102Z_1$-$102Z_2$ and associated GPGPU memories $112Z_1$-112Z).

At operation 508, the application agent 120A and the proxy agent 122 establish a dedicated session/connection $136_1$ for the workload/application 104A. This session/connection $136_1$ may be used for transferring requests/commands from the application 104A, which describe details of a workload of the application 104A to be assigned to a GPGPU 102 (e.g., an amount of GPGPU memory 112 and/or a desired/requested GPGPU 102 architecture).

At operation 510, the proxy agent 122 selects a GPGPU 102 for the workload of the application 104. The GPGPU 102 is selected from a set of GPGPUs 102 in the data center system 100 (e.g., all of the GPGPUs 102 in the data center system 100) and the selection is based on the available resources from the set of GPGPUs 102 (e.g., available GPGPU memory 112) and/or requirements of the workload/application 104A.

Figure 6:
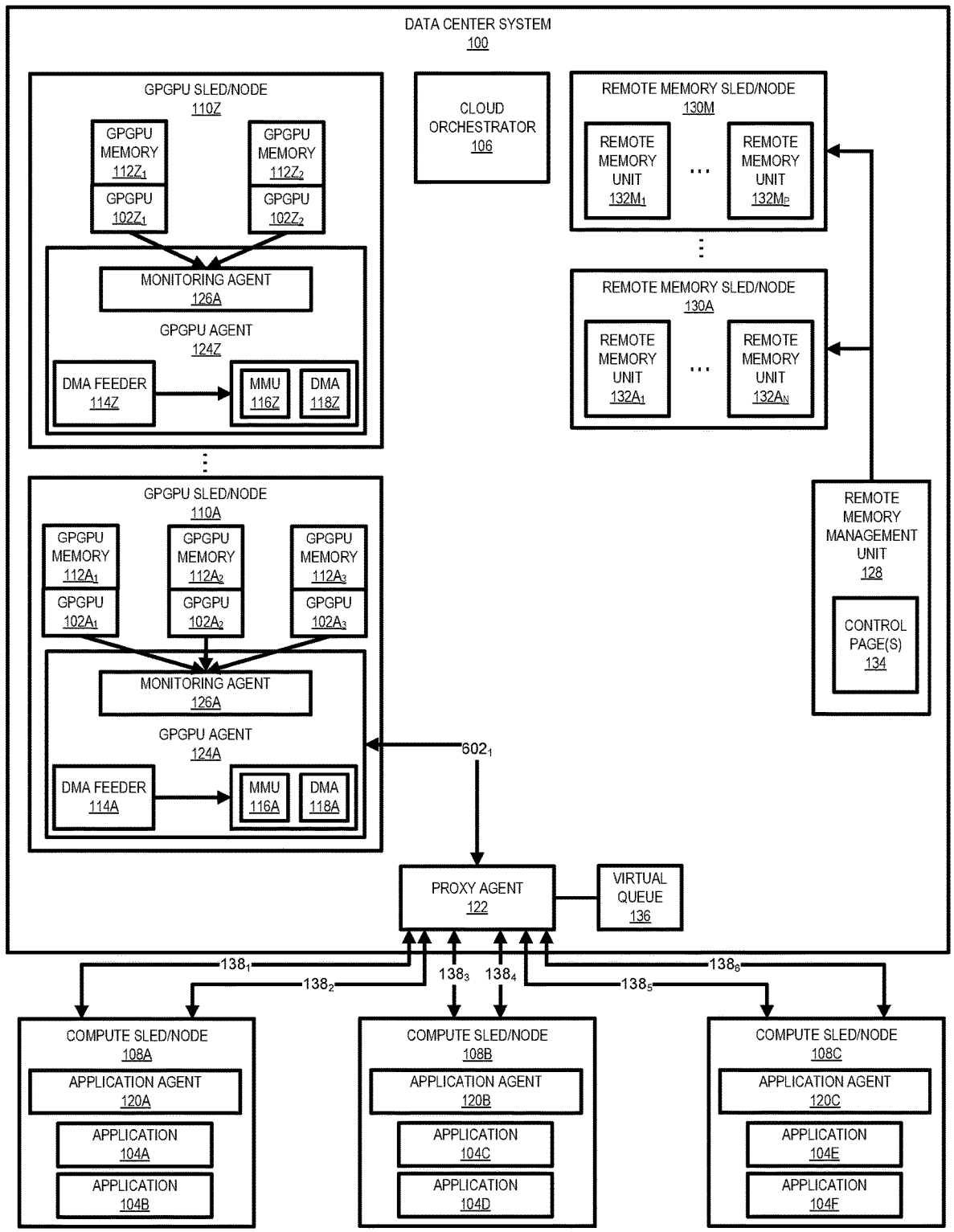
FIG. 6 shows a first session/connection between a proxy agent and a first GPGPU agent for a workload/application, according to one example embodiment.

At operation 512, the proxy agent 122 establishes a session/connection for the workload/application 104A with a GPGPU agent 124 of an associated GPGPU node 110 on which the selected GPGPU 102 resides. For example, the proxy agent 122 may select the GPGPU $102A_1$ of the GPGPU node 110A at operation 510. Based on this selection, the proxy agent 122 establishes a session/connection with the GPGPU agent 124A for the workload/application 104A at operation 512. For example, FIG. 6 shows a session/connection $602_1$ between the proxy agent 122 and the GPGPU agent 124A for the workload/application 104A. This session/connection $602_1$ may be used for transferring requests/commands from the application 104A to the GPGPU agent 124A via the proxy agent 122. For purposes of explanation, the method 500 will be described in relation to the workload/application 104A being assigned to the GPGPU $102A_1$ on the GPGPU node 110A.

At operation 513, the proxy agent 122 may update a status of the workload/application 104A in the data center system 100. In particular, the proxy agent 122 may update the status 208 in the table 200 shown in FIG. 4 to note that the workload/application 104A has been allocated/scheduled/assigned to the GPGPU $102A_1$.

At operation 514, the GPGPU agent 124A receives a GPGPU request from the application 104A. The GPGPU request is a request to process the workload of the application 104A and includes details of processing the workload. As mentioned above, the application agent 120A emulates a set of virtual GPGPUs that the application 104A interacts (e.g., the application 104A transmits GPGPU requests to these virtual GPGPUs). In response to interaction with these virtual GPGPUs, the application agent 120A forwards the GPGPU requests to the proxy agent 122 for processing by an assigned/selected GPGPU $102A_1$ in the data center system 100.

At operation 516, the GPGPU $102A_1$ processes the indicated workload of the application 104A based on the GPGPU request. This processing includes use of the associated GPGPU memory $112A_1$ attached or otherwise associated with the GPGPU $102A_1$.

At operation 518, the monitoring agent 126A of the GPGPU agent 124A monitors resources of the GPGPU $102A_1$ and/or the workload of the application 104A being processed by the GPGPU $102A_1$. In particular, the monitoring agent 126A monitors and profiles the GPGPU $102A_1$, including associated resources and workloads/applications 104 being processed by the GPGPU 102A$_1$. The monitoring information produced by the monitoring agent 126A can be used to form usage/performance profiles for the workload/application 104A that describe the performance/operation of workload of the application 104A on the GPGPU 102A$_1$, including respective GPGPU memory 112A usage. Although shown as a single operation, the monitoring agent 126A may continually generate monitoring information to update the usage/performance profiles of the workload/application 104.

At operation 520, the proxy agent 122 may determine if an idle period for the workload/application 104A on the GPGPU 102A$_1$ is below a threshold usage/idle value. In particular, the proxy agent 122 may determine whether the workload/application 104A, which is being processed by the GPGPU 102A$_1$, is efficiently using resources of the GPGPU 102A$_1$ or is underutilizing resources of the GPGPU 102A$_1$. In some embodiments, the proxy agent 122 may use a usage/performance profile of the workload/application 104A, which was generated based on monitoring information from the monitoring agent 126A, to determine whether an idle period for the workload/application 104A on the GPGPU 102A$_1$ is below the threshold usage/idle value. In response to determining at operation 520 that an idle period for the workload/application 104A on the GPGPU 102A$_1$ is not below the threshold usage/idle value, the method 500 may return to operation 516 to continue processing the workload/application 104A. Conversely, in response to determining at operation 520 that an idle period for the workload/application 104A on the GPGPU 102A$_1$ is below the threshold usage/idle value, the method 500 may move to operation 522.

At operation 522, the proxy agent 122 may designate the workload/application 104A as a candidate for eviction from the GPGPU 102A$_1$ and may add an identifier for this workload/application 104A to a candidate list of workloads/applications 104 for eviction. In particular, since the workload/application 104A is not efficiently utilizing resources of the GPGPU 102A$_1$, the proxy agent 122 may determine that this workload/application 104A can be evicted from the GPGPU 102A$_1$ in favor of a workload/application 104 that may more efficiently utilize resources of the GPGPU 102A$_1$.

At operation 524, the proxy agent 122 may determine if there is a need to evict the workload/application 104A from the GPGPU 102A$_1$. For example, in response to receipt of a GPGPU request from another application 104, the proxy agent 122 may determine that there are no available GPGPUs 102 to handle the GPGPU request (i.e., a workload/application has been assigned to each GPGPU 102 in the data center system 100). Since the workload/application 104A is underutilizing the GPGPU 102A$_1$ (as determined at operation 522), the proxy agent 122 may determine at operation 524 that there is a need to evict the workload/application 104A from the GPGPU 102A$_1$. In response to determining that there is not a need to evict the workload/application 104A from the GPGPU 102A$_1$, the method 500 may return to operation 516 to continue processing the workload/application 104A. Conversely, in response to determining that there is a need to evict the workload/application 104A from the GPGPU 102A$_1$, the method 500 may move to operation 525. In the example used herein, the workload/application 104A is determined to be evicted from the GPGPU 102A$_1$ at operation 524. However, the proxy agent 122 may have indicated that several workloads/applications 104 are candidates to be evicted and the workload/application 104A was selected because of (1) the degree of use of the associated GPGPU 102A$_1$ (e.g., high idle time in relation to other candidate workloads/applications 104 for eviction), (2) resource similarities between the workload/application 104A and the workload/application 104 that is to be assigned to a GPGPU 102, (3) a lower priority of the candidate workload/application 104 than that of the workload/application 104 that is to be assigned to a GPGPU 102, and/or (4) a round robin approach.

At operation 525, the proxy agent 122 may update a status of the workload/application 104A in the data center system 100. In particular, the proxy agent 122 may update the status 208 in the table 200 shown in FIG. 4 to note that the workload/application 104A is being evicted to the disaggregated/global memory units 132.

At operation 526, GPGPU requests from the application 104A, received after determining/selecting to evict the workload of the application 104A from the GPGPU 102A$_1$, are buffered in a virtual queue 136 of the proxy agent 122 without forwarding them to the previously allocated GPGPU 102A$_1$. This buffering will maintain complete transparency of the eviction to the application 104A on the compute node 108A as requests/commands will not be lost during the data transfer.

At operation 528, the GPGPU agent 124A may prioritize existing/pending requests/commands associated with the workload/application 104A that has been selected for eviction. These existing/pending requests/commands have already been received by the GPGPU agent 124A and are to be completed by the GPGPU 102A$_1$ before eviction can occur. In some embodiments, the proxy agent 122 may trigger or otherwise cause the GPGPU agent 124A to prioritize existing/pending requests/commands.

At operation 530, the proxy agent 122 may obtain from the remote memory management unit 128, following completion of all pending requests/commands associated with the selected workload/application 104A to be evicted, a range of destination memory addresses for transferring data of the evicted workload/application 104A to remote memory units 132. This range of destination memory addresses of the remote memory units 132 will be used for storing data of the workload/application 104A until reassignment to another GPGPU 102.

At operation 532, the remote memory management unit 128 allocates a control page 134 to map source virtual addresses of the evicted workload/application 104A to the corresponding destination addresses of the remote memory units 132. Following population with virtual to physical address mappings, this control page 134 will serve as a guide for future use of data of the workload/application 104A stored in the disaggregated/global memory units 132.

At operation 534, the GPGPU agent 124A transfers data of the workload/application 104A from the GPGPU memory 112A$_1$ to the remote memory units 132 using the source virtual addresses of the GPGPU memory 112A$_1$ and destination addresses of the disaggregated/global memory units 132. Namely, the GPGPU agent 124A transfers data of the workload/application 104A from locations in the GPGPU memory 112A$_1$ corresponding to the source virtual addresses to locations in the remote memory units 132 corresponding to the destination addresses.

At operation 536, the remote memory management unit 128 updates the control page 134 based on the transfer of data of the workload/application 104A. Namely, mappings are stored in the control page 134 to designate transfers of data between locations in the GPGPU memory 112A$_1$ corresponding to the source virtual addresses to locations in the remote memory units 132 corresponding to the destination physical addresses.

At operation 538, portions of the GPGPU memory 112A allocated to the workload/application 104A are freed or otherwise deallocated following transfer to the remote memory units 132. Accordingly, these now freed/deallocated portions of the GPGPU memory 112A can be used for another workload/application 104.

At operation 540, the GPGPU agent 124A may report the completion of the data transfer/eviction of the workload/application 104A from the GPGPU $102A_1$ to the proxy agent 122.

At operation 542, the proxy agent 122 may update a status of the workload/application 104A in the data center system 100. In particular, the proxy agent 122 may update the status 208 in the table 200 shown in FIG. 4 to note that the workload/application 104A has been evicted to the disaggregated/global memory units 132.

At operation 544, the proxy agent 122 may terminate the connection/session $602_1$ with the GPGPU agent 124A in relation to the evicted workload/application 104A. In one embodiment, this termination is made in response to receipt from the GPGPU agent 124A that the transfer/eviction of the workload/application 104A from the GPGPU $102A_1$ has completed.

At operation 546, the proxy agent 122 may continually determine if a request/command associated with the workload/application 104A has been received. Upon receipt of a request request/command associated with the workload/application 104A, the method 500 may move to operation 548.

At operation 548, the proxy agent 122 selects a GPGPU 102 for the previously evicted workload/application 104A. Similar to operation 510, the GPGPU 102 is selected from a set of GPGPUs 102 in the data center system 100 (e.g., all of the GPGPUs 102 in the data center system 100) and the selection is based on the available resources from the set of GPGPUs 102 (e.g., available GPGPU memory 112) and/or requirements of the workload/application 104A. For example, the proxy agent 122 may select the GPGPU $102Z_2$ for the workload/application 104A at operation 548.

At operation 550, the selected GPGPU 102 imports workload/application data associated with the workload/application 104A from the remote memory units 132, where the data was previously evited, to GPGPU memory 112 associated with the selected GPGPU 102 (e.g., the GPGPU memory $112Z_2$ when the GPGPU $102Z_2$ is selected at operation 548). In one embodiment this importation is performed based on or otherwise with consideration to the mappings of source virtual addresses of the evicted workload/application 104A to the corresponding destination addresses of the remote memory units 132 stored in the control page 134.

Figure 7:
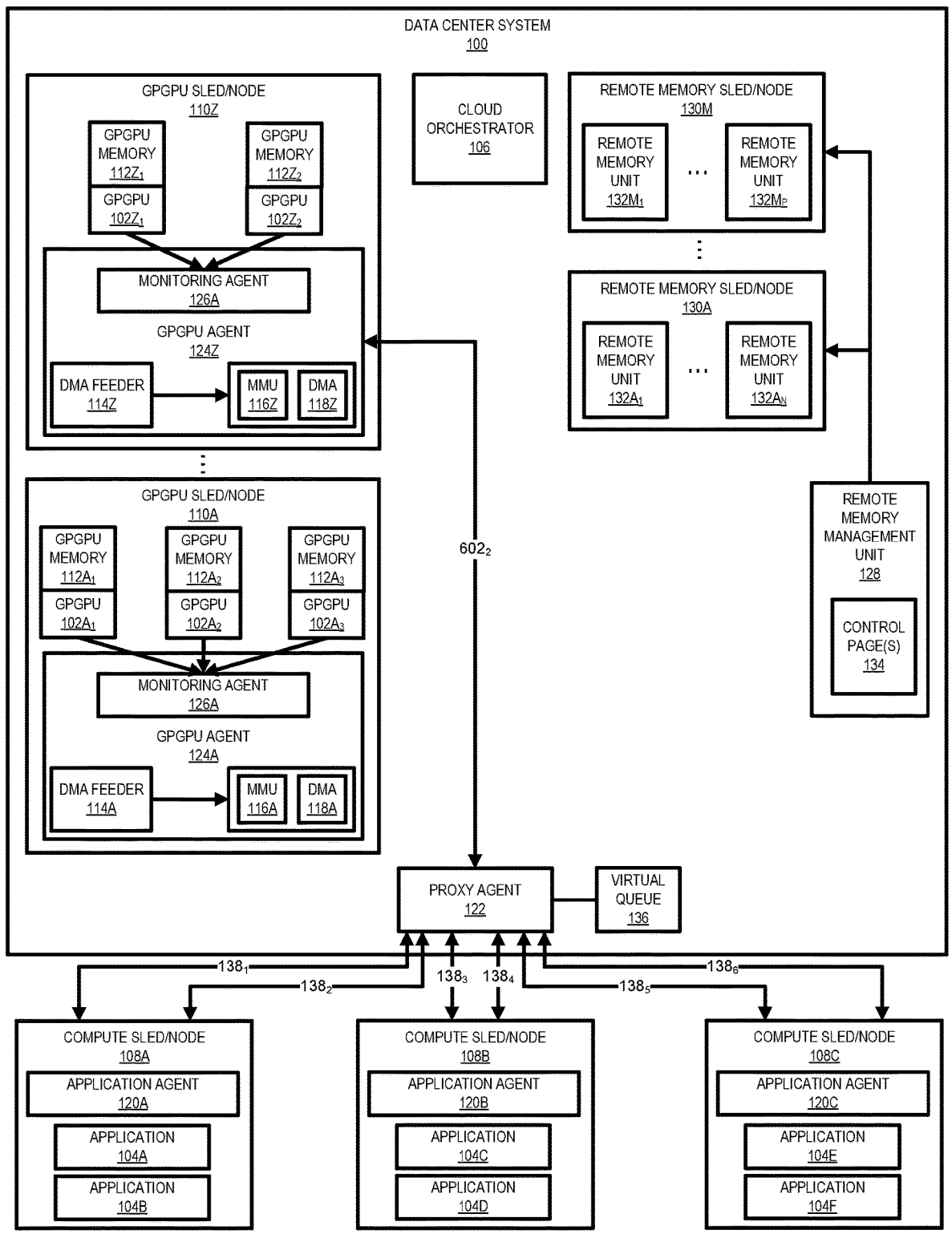
FIG. 7 shows a second session/connection between the proxy agent and a second GPGPU agent for the workload/application, according to one example embodiment.

At operation 552, entries in the control page 134 associated with the workload/application 104A are removed such that associated space in the remote memory units 132 devoted to the workload/application 104A is deallocated/freed. Thereafter, the method 500 may move to operation 512 for the proxy agent 122 to establish a session/connection with a GPGPU agent 124 of the selected GPGPU 102 for the workload/application 104A. For example, when the GPGPU $102Z_2$ is selected at operation 548 for the workload/application 104A, the proxy agent 122 establishes a session/connection $602_2$ between the proxy agent 122 and the GPGPU agent 124Z for the workload/application 104A, as shown in FIG. 7.

Figure 8A:
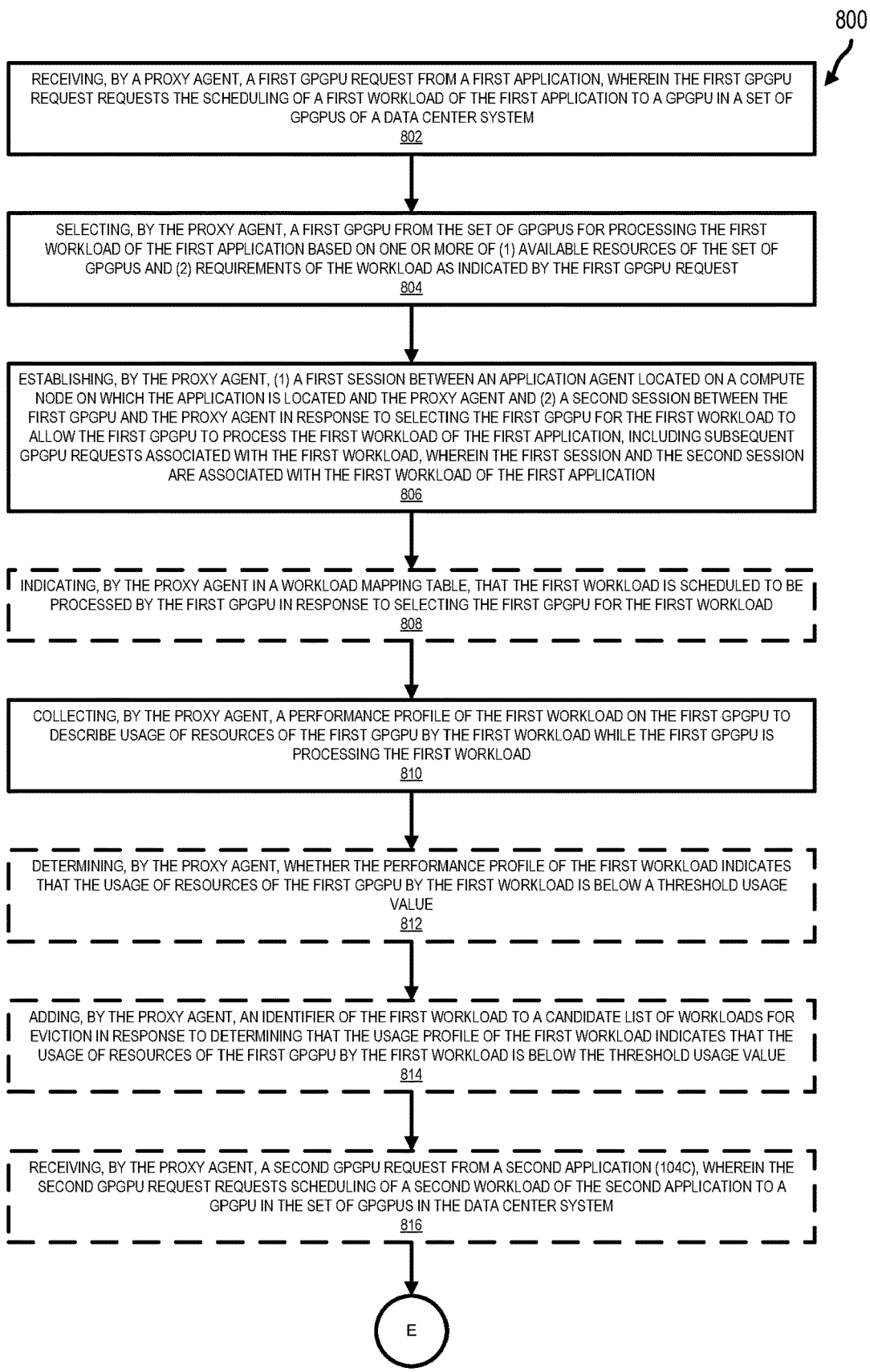
FIGS. 8A-8C illustrate a method for managing placement/scheduling of workloads of applications to GPGPUs in the data center system, according to one example embodiment.
Figure 8B:
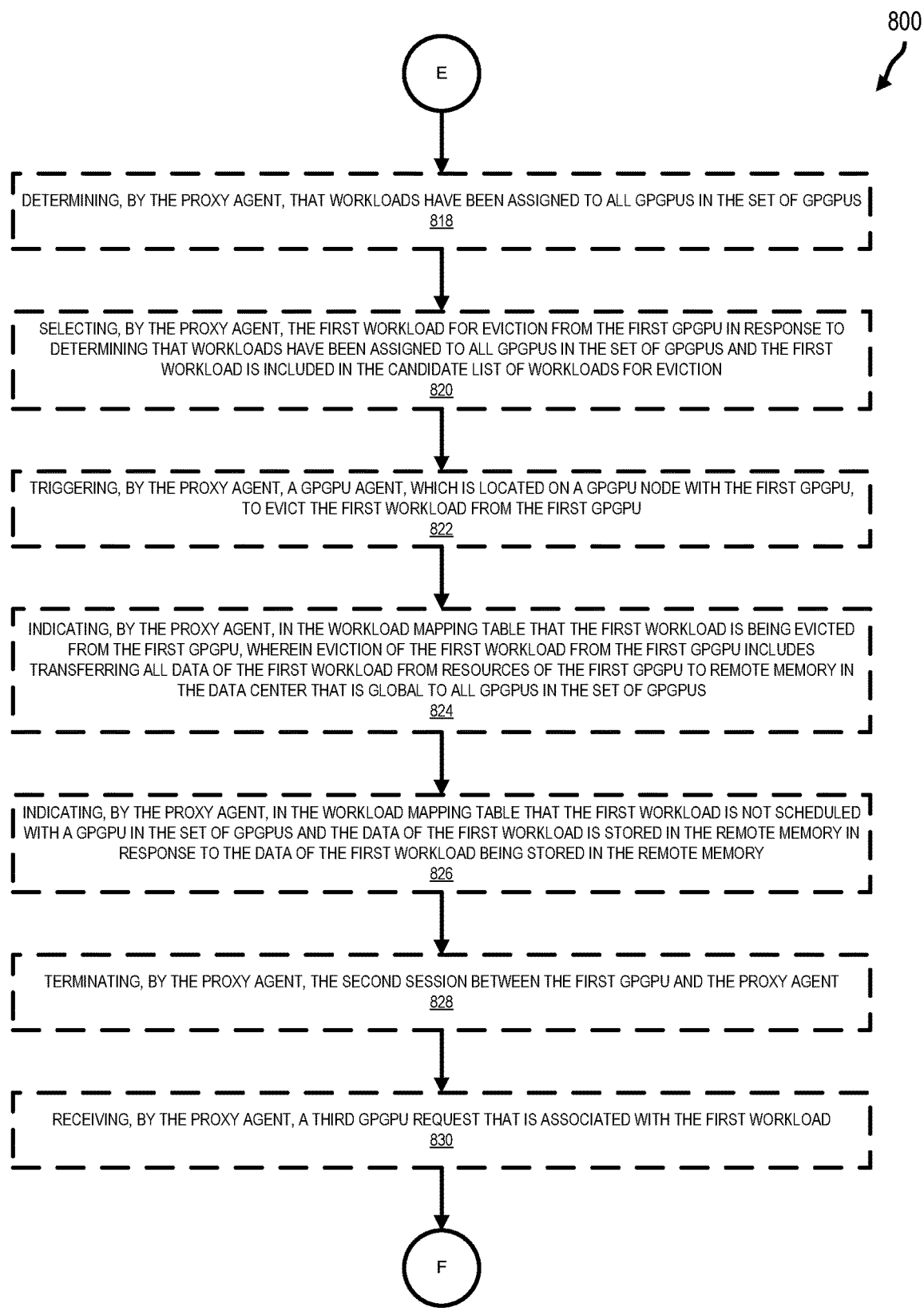
Figure 8C:
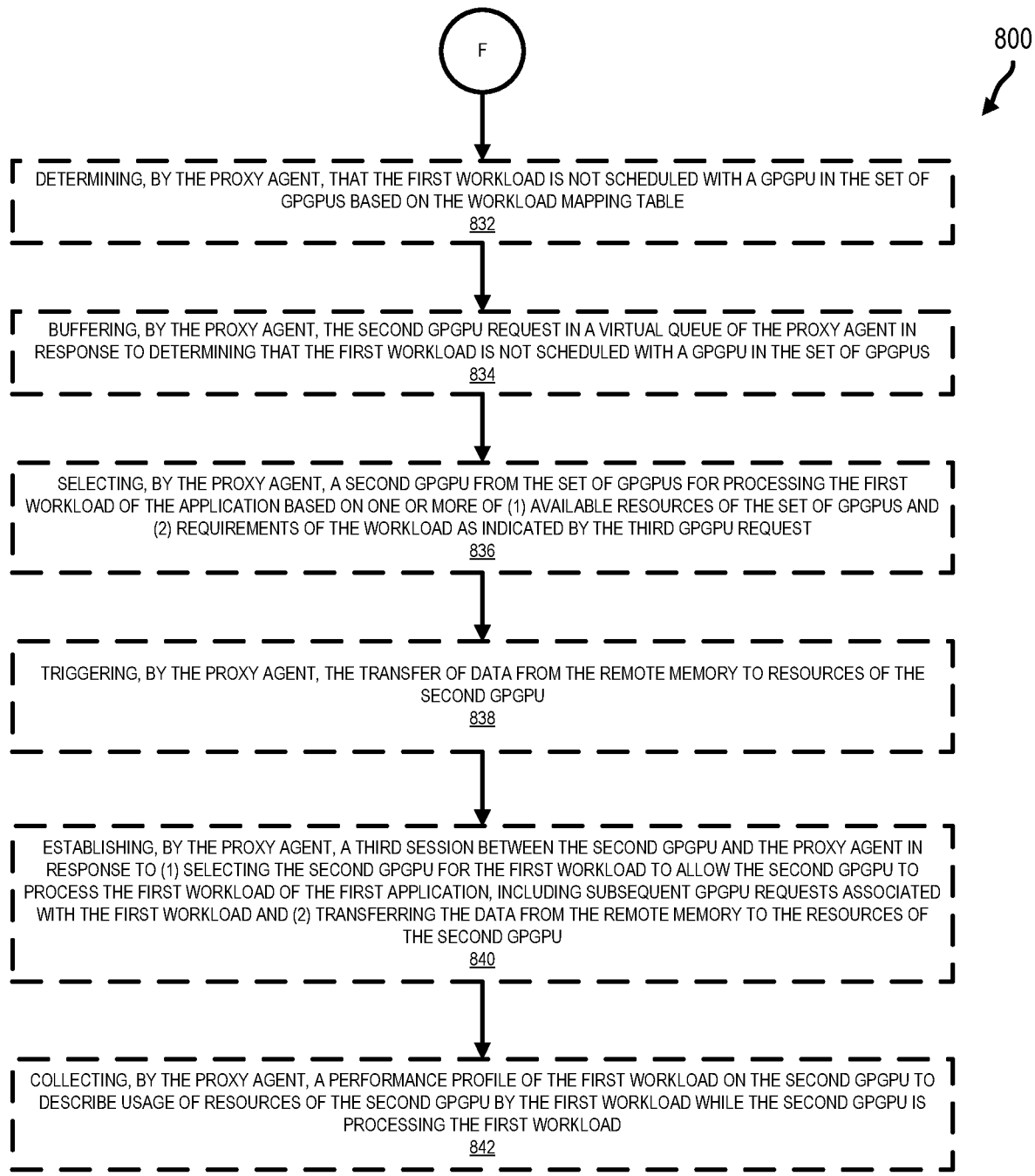

Turning now to FIGS. 8A-8C, a method 800 will be described for managing placement/scheduling of workloads of applications 104 to GPGPUs 102 in the data center system 100, according to one example embodiment. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

As shown in FIGS. 8A-8C, the method 800 may commence at operation 802 with the proxy agent 122 receiving a first GPGPU request from a first application 104. The first GPGPU request requests the scheduling of a first workload of the first application 104 to a GPGPU 102 in a set of GPGPUs 102 of a data center system 100. Hereinafter, the application 104A will be used for purposes of illustration.

At operation 804, the proxy agent 122 selects a first GPGPU 102 from the set of GPGPUs for processing the first workload of the first application 104A based on one or more of (1) available resources of the set of GPGPUs 102 (e.g., the GPGPU memory 112) and (2) requirements of the workload as indicated by the first GPGPU request. Hereinafter, the method 800 will be described in relation to the proxy agent 122 selecting the GPGPU $102A_1$ for the first workload of the first application 104A at operation 804.

At operation 806, the proxy agent 122 establishes (1) a first session $138_1$ between an application agent 120A located on a compute node 108A on which the application 104A is located and the proxy agent 122 and (2) a second session $602_1$ between the first GPGPU $102A_1$ and the proxy agent 122 in response to selecting the first GPGPU $102A_1$ for the first workload to allow the first GPGPU $102A_1$ to process the first workload of the first application 104A, including subsequent GPGPU requests associated with the first workload.

At operation 808, the proxy agent 122 indicates in a workload mapping table 200, that the first workload is scheduled to be processed by the first GPGPU $102A_1$ in response to selecting the first GPGPU $102A_1$ for the first workload.

At operation 810, the proxy agent 122 collects a performance profile of the first workload on the first GPGPU $102A_1$ to describe usage of resources of the first GPGPU $102A_1$ by the first workload while the first GPGPU $102A_1$ is processing the first workload.

At operation 812, the proxy agent 122 determines whether the performance profile of the first workload indicates that the usage of resources of the first GPGPU $102A_1$ by the first workload is below a threshold usage value.

At operation 814, the proxy agent 122 adds an identifier of the first workload to a candidate list of workloads for eviction in response to determining that the performance profile of the first workload indicates that the usage of resources of the first GPGPU $102A_1$ by the first workload is below the threshold usage value.

At operation 816, the proxy agent 122 receives a second GPGPU request from a second application 104C, wherein the second GPGPU request requests scheduling of a second workload of the second application 104C to a GPGPU 102 in the set of GPGPUs 102 in the data center system 100.

At operation 818, the proxy agent 122 determines that workloads have been assigned to all GPGPUs 102 in the set of GPGPUs 102.

At operation 820, the proxy agent 122 selects the first workload for eviction from the first GPGPU $102A_1$ in response to determining that workloads have been assigned to all GPGPUs 102 in the set of GPGPUs 102 and the first workload is included in the candidate list of workloads for eviction. In one embodiment, selecting the first workload for eviction is based on one or more of (1) a similarity between characteristics of the first workload and characteristics of the second workload, (2) a priority level of the first workload that is lower than a priority level of the second workload, and (3) a round robin approach.

At operation 822, the proxy agent 122 triggers a GPGPU agent 124A, which is located on a GPGPU node 110A with the first GPGPU $102A_1$, to evict the first workload from the first GPGPU $102A_1$.

At operation 824, the proxy agent 122 indicates in the workload mapping table 200 that the first workload is being evicted from the first GPGPU $102A_1$. In one embodiment, eviction of the first workload from the first GPGPU $102A_1$ includes transferring all data of the first workload from resources (e.g., the GPGPU memory $112A_1$) of the first GPGPU $102A_1$ to remote memory 132 in the data center system 100 that is global to all GPGPUs 102 in the set of GPGPUs 102.

At operation 826, the proxy agent 122 indicates, in the workload mapping table 200, that the first workload is not scheduled with a GPGPU 102 in the set of GPGPUs 102 and the data of the first workload is stored in the remote memory 132 in response to the data of the first workload being entirely moved into the remote memory 132.

At operation 828, the proxy agent 122 terminates the second session $602_1$ between the first GPGPU $102A_1$ and the proxy agent 122.

At operation 830, the proxy agent 122 receives a third GPGPU request that is associated with the first workload.

At operation 832, the proxy agent 122 determines that the first workload is not scheduled with a GPGPU 102 in the set of GPGPUs 102 based on the workload mapping table 200.

At operation 834, the proxy agent 122 buffers the second GPGPU request in a virtual queue 136 of the proxy agent 122 in response to determining that the first workload is not scheduled with a GPGPU 102 in the set of GPGPUs 102.

At operation 836, the proxy agent 122 selects a second GPGPU $102A_2$ from the set of GPGPUs 102 for processing the first workload of the application 104A based on one or more of (1) available resources of the set of GPGPUs 102 and (2) requirements of the workload as indicated by the third GPGPU request.

At operation 838, the proxy agent 122 triggers the transfer of data from the remote memory 132 to resources $112A_2$ of the second GPGPU $102A_2$.

At operation 840, the proxy agent 122 establishes a third session $602_2$ between the second GPGPU $102A_2$ and the proxy agent 122 in response to (1) selecting the second GPGPU $102A_2$ for the first workload to allow the second GPGPU $102A_2$ to process the first workload of the first application 104A, including subsequent GPGPU requests associated with the first workload and (2) transferring the data from the remote memory 132 to the resources of the second GPGPU $102A_2$.

At operation 842, the proxy agent 122 collects a performance profile of the first workload on the second GPGPU $102A_2$ to describe usage of resources of the second GPGPU $102A_2$ by the first workload while the second GPGPU $102A_2$ is processing the first workload. In one embodiment, the first session $138_1$ and the second session $602_1$ are associated with the first workload of the first application 104A. In one embodiment, the application agent 120A is to emulate a set of virtual GPGPUs, and wherein the first application 104A is to transfer the first GPGPU request and the third GPGPU request to the set of virtual GPGPUs such that the application agent 120A can forward the first GPGPU request and the third GPGPU request to the proxy agent 122 via the first session $138_1$.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950, a cloud orchestrator 106, a GPGPU agent(s) 124, a GPGPU(s) 102, an application 104, remote memory management unit 128, and/or a proxy agent 122. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., fault detection and processing).

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988, a cloud orchestrator 106, a GPGPU agent(s) 124, a GPGPU(s) 102, an application 104, remote memory management unit 128, and/or a proxy agent 122. The centralized control plane 976 has the ability to form virtual networks 992 (sometimes referred to as a logical forwarding plane, network services, or overlay networks (with the NEs 970A-H of the data plane 980 being the underlay network)) for the application(s) 988, a cloud orchestrator 106, a GPGPU agent(s) 124, a GPGPU(s) 102, an application 104, remote memory management unit 128, and/or a proxy agent 122. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
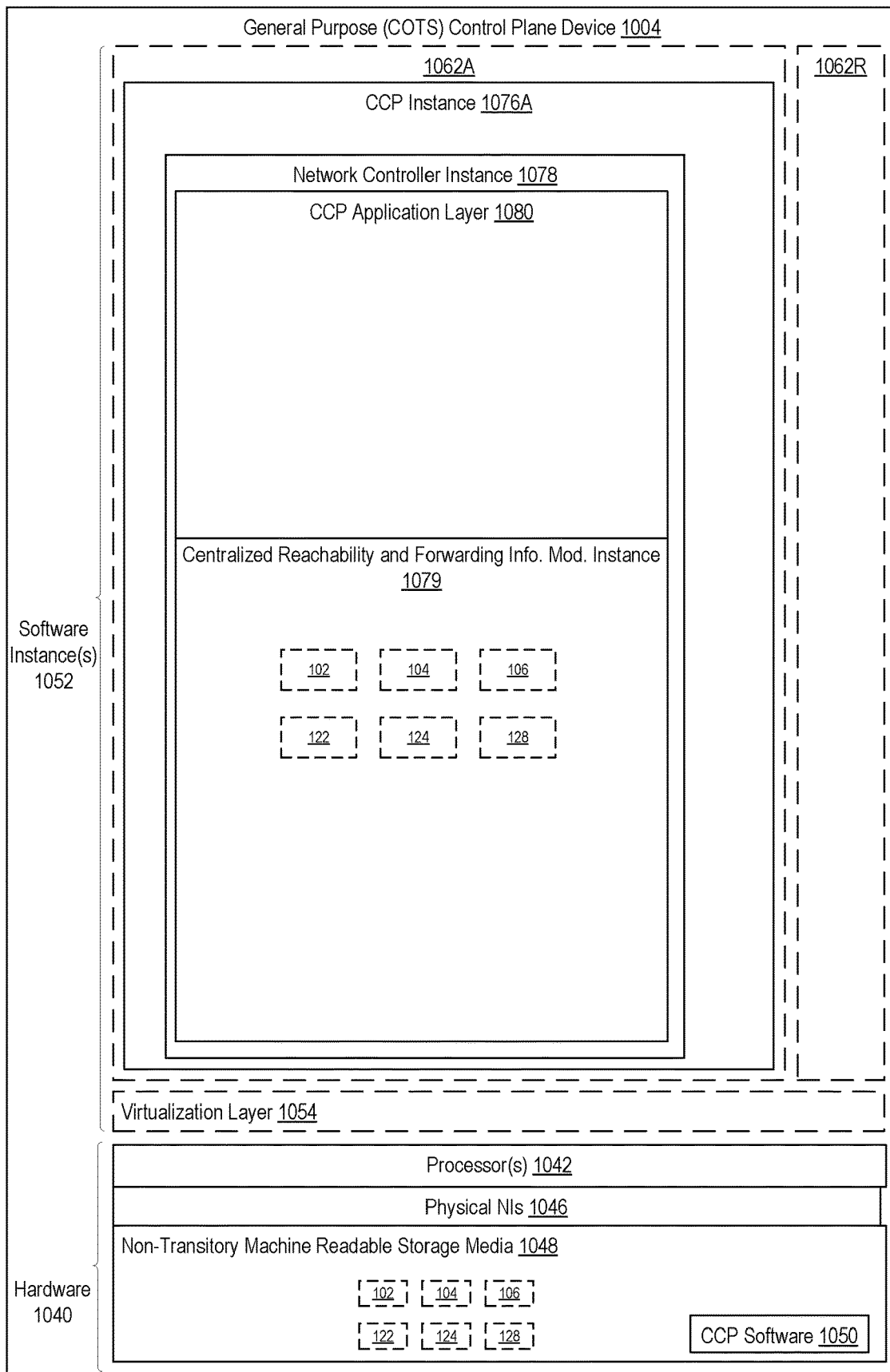
FIG. 10 illustrates a general-purpose control plane device with centralized control plane (CCP) software, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050, a cloud orchestrator 106, a GPGPU agent(s) 124, a GPGPU(s) 102, an application 104, remote memory management unit 128, and/or a proxy agent 122.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for managing general-purpose graphical processing units (GPGPUs) in a data center system, the method comprising:

receiving, by a proxy agent, a first GPGPU request from an application agent of a first application to establish a first session between the application agent and the proxy agent, wherein the first GPGPU request requests scheduling of a first workload of the first application to a GPGPU in a set of GPGPUs of the data center system and wherein the application agent emulates a virtual GPGPU for the first application for transparency to the first application in accessing the GPGPUs in the data center system;

selecting, by the proxy agent via a corresponding GPGPU agent, a first GPGPU from the set of GPGPUs for processing the first workload of the first application based on one or more of available resources of the set of GPGPUs and requirements of the first workload as indicated by the first GPGPU request to establish a second session between the proxy agent and the first GPGPU;

establishing, by the proxy agent, the first session between the application agent and the proxy agent and the second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collecting, by the proxy agent, a performance profile of the first workload on the first GPGPU to describe usage of resources of the first GPGPU by the first workload while the first GPGPU is processing the first workload.

2. The method of claim 1, further comprising:
indicating, by the proxy agent in a workload mapping table, that the first workload is scheduled to be processed by the first GPGPU in response to selecting the first GPGPU for the first workload.

3. The method of claim 2, further comprising:
determining, by the proxy agent, whether the performance profile of the first workload indicates that the usage of resources of the first GPGPU by the first workload is below a threshold usage value; and adding, by the proxy agent, an identifier of the first workload to a candidate list of workloads for eviction in response to determining that the performance profile of the first workload indicates that the usage of resources of the first GPGPU by the first workload is below the threshold usage value.

4. The method of claim 3, further comprising:
receiving, by the proxy agent, a second GPGPU request from a second application, wherein the second GPGPU request requests scheduling of a second workload of the second application to a GPGPU in the set of GPGPUs in the data center system;

determining, by the proxy agent, that workloads have been assigned to all GPGPUs in the set of GPGPUs; and selecting, by the proxy agent, the first workload for eviction from the first GPGPU in response to determining that workloads have been assigned to all GPGPUs in the set of GPGPUs and the first workload is included in the candidate list of workloads for eviction.

5. The method of claim 4, wherein selecting the first workload for eviction is based on one or more of: a similarity between characteristics of the first workload and characteristics of the second workload; a priority level of the first workload that is lower than a priority level of the second workload; and a round robin approach.

6. The method of claim 5, further comprising:
triggering, by the proxy agent, a GPGPU agent, which is located on a GPGPU node with the first GPGPU, to evict the first workload from the first GPGPU; and indicating, by the proxy agent in the workload mapping table that the first workload is being evicted from the first GPGPU, wherein eviction of the first workload from the first GPGPU includes transferring all data of the first workload from resources of the first GPGPU to remote memory in the data center system that is global to all GPGPUs in the set of GPGPUs.

7. The method of claim 6, further comprising:
indicating, by the proxy agent in the workload mapping table, that the first workload is not scheduled with a GPGPU in the set of GPGPUs and the data of the first workload is stored in the remote memory in response to the data of the first workload being entirely moved into the remote memory; and terminating, by the proxy agent, the second session between the first GPGPU and the proxy agent.

8. The method of claim 7, further comprising:
receiving, by the proxy agent, a third GPGPU request that is associated with the first workload;

determining, by the proxy agent, that the first workload is not scheduled with a GPGPU in the set of GPGPUs based on the workload mapping table; and buffering, by the proxy agent, the second GPGPU request in a virtual queue of the proxy agent in response to determining that the first workload is not scheduled with a GPGPU in the set of GPGPUs.

9. The method of claim 8, further comprising:
selecting, by the proxy agent, a second GPGPU from the set of GPGPUs for processing the first workload of the first application based on one or more of available resources of the set of GPGPUs and requirements of a workload as indicated by the third GPGPU request;

triggering, by the proxy agent, a transfer of data from the remote memory to resources of the second GPGPU;

establishing, by the proxy agent, a third session. between the second GPGPU and the proxy agent in response to selecting the second GPGPU for the first workload to allow the second GPGPU to process the first workload of the first application, including subsequent GPGPU requests associated with the first workload, and transferring the data from the remote memory to the resources of the second GPGPU; and collecting, by the proxy agent, a performance profile of the first workload on the second GPGPU to describe usage of resources of the second GPGPU by the first workload while the second GPGPU is processing the first workload.

10. The method of claim 9, wherein the application agent is to emulate a set of virtual GPGPUs and wherein the first application is to transfer the first GPGPU request and the third GPGPU request to the set of virtual GPGPUs and the application agent forwards the first GPGPU request and the third GPGPU request to the proxy agent via the first session.

11. A non-transitory machine-readable storage medium that provides instructions that, when executed by a processor of a proxy agent in a data center system, will cause said processor to perform operations to manage general-purpose graphical processing units (GPGPUs) in a data center system comprising:

receiving a first GPGPU request from an application agent of a first application to establish a first session between the application agent and the proxy agent, wherein the first GPGPU request requests scheduling of a first workload of the first application to a GPGPU in a set of GPGPUs of the data center system and wherein the application agent emulates a virtual GPGPU for the first application for transparency to the first application in accessing the GPGPUs in the data center system;

selecting, by the proxy agent via a corresponding GPGPU agent, a first GPGPU from the set of GPGPUs for processing the first workload of the first application based on one or more of available resources of the set of GPGPUs and requirements of the first workload as indicated by the first GPGPU request to establish a second session between the proxy agent and the first GPGPU;

establishing, by the proxy agent, the first session between the application agent and the proxy agent and the second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collecting a performance profile of the first workload on the first GPGPU to describe usage of resources of the first GPGPU by the first workload while the first GPGPU is processing the first workload.

12. The non-transitory machine-readable storage medium of claim 11, wherein the operations further comprise:

indicating, in a workload mapping table, that the first workload is scheduled to be processed by the first GPGPU in response to selecting the first GPGPU for the first workload.

13. The non-transitory machine-readable storage medium of claim 12, wherein the operations further comprise:

determining whether the performance profile of the first workload indicates that the usage of resources of the first GPGPU by the first workload is below a threshold usage value; and adding an identifier of the first workload to a candidate list of workloads for eviction in response to determining that the performance profile of the first workload indicates that the usage of resources of the first GPGPU by the first workload is below the threshold usage value.

14. The non-transitory machine-readable storage medium of claim 13, wherein the operations further comprise:

receiving a second GPGPU request from a second application, wherein the second GPGPU request requests scheduling of a second workload of the second application to a GPGPU in the set of GPGPUs in the data center system;

determining that workloads have been assigned to all GPGPUs in the set of GPGPUs; and selecting the first workload for eviction from the first GPGPU in response to determining that workloads have been assigned to all GPGPUs in the set of GPGPUs and the first workload is included in the candidate list of workloads for eviction, wherein selecting the first workload for eviction is based on one or more of a similarity between characteristics of the first workload and characteristics of the second workload; a priority level of the first workload that is lower than a priority level of the second workload; and a round robin approach.

15. The non-transitory machine-readable storage medium of claim 14, wherein the operations further comprise:

triggering a GPGPU agent, which is located on a GPGPU node with the first GPGPU, to evict the first workload from the first GPGPU; and indicating in the workload mapping table that the first workload is being evicted from the first GPGPU, wherein eviction of the first workload from the first GPGPU includes transferring all data of the first workload from resources of the first GPGPU to remote memory in the data center system that is global to all GPGPUs in the set of GPGPUs.

16. The non-transitory machine-readable storage medium of claim 15, wherein the operations further comprise:

indicating in the workload mapping table that the first workload is not scheduled with a GPGPU in the set of GPGPUs and the data of the first workload is stored in the remote memory in response to the data of the first workload being entirely moved into the remote memory; and terminating the second session between the first GPGPU and the proxy agent.

17. The non-transitory machine-readable storage medium of claim 16, wherein the operations further comprise:

receiving a third GPGPU request that is associated with the first workload;

determining that the first workload is not scheduled with a GPGPU in the set of GPGPUs based on the workload mapping table; and buffering the second GPGPU request in a virtual queue of the proxy agent in response to determining that the first workload is not scheduled with a GPGPU in the set of GPGPUs.

18. The non-transitory machine-readable storage medium of claim 17, wherein the operations further comprise:

selecting a second GPGPU from the set of GPGPUs for processing the first workload of the first application based on one or more of available resources of the set of GPGPUs and requirements of a workload as indicated by the third GPGPU request;

triggering a transfer of data from the remote memory to resources of the second GPGPU;

establishing a third session between the second GPGPU and the proxy agent in response to selecting the second GPGPU for the first workload to allow the second GPGPU to process the first workload of the first application, including subsequent GPGPU requests associated with the first workload, and transferring the data from the remote memory to the resources of the second GPGPU; and collecting a performance profile of the first workload on the second GPGPU to describe usage of resources of the second GPGPU by the first workload while the second GPGPU is processing the first workload.

19. The non-transitory machine-readable storage medium of claim 18, wherein the application agent is to emulate a set of virtual GPGPUs and wherein the first application is to transfer the first GPGPU request and the third GPGPU request to the set of virtual GPGPUs and the application agent forwards the first GPGPU request and the third GPGPU request to the proxy agent via the first session.

20. A device to operate as a proxy agent for managing general-purpose graphical processing units (GPGPUs) in a data center system, the device comprising:

at least one processor; and a storage medium comprising instructions which, when executed by the at least one processor, cause the device to:

receive a first GPGPU request from an application agent of a first application to establish a first session between the application agent and the proxy agent, wherein the first GPGPU request requests scheduling of a first workload of the first application to a GPGPU in a set of GPGPUs of the data center system and wherein the application agent emulates a virtual GPGPU for the first application for transparency to the first application in accessing the GPGPUs in the data center system;

select, via a corresponding GPGPU agent, a first GPGPU from the set of GPGPUs for processing the first workload of the first application based on one or more of available resources of the set of GPGPUs and requirements of the first workload as indicated by the first GPGPU request to establish a second session between the proxy agent and the first GPGPU;

establish the first session between the application agent and the proxy agent and a second session between the first GPGPU and the proxy agent in response to selecting the first GPGPU for the first workload to allow the first GPGPU to process the first workload of the first application, including subsequent GPGPU requests associated with the first workload, wherein the first session and the second session are associated with the first workload of the first application; and collect a performance profile of the first workload on the first GPGPU to describe usage of resources of the first GPGPU by the first workload while the first GPGPU is processing the first workload.

* * * * *